United States Patent
Ferrer

(10) Patent No.: US 10,999,620 B2
(45) Date of Patent: May 4, 2021

(54) SYSTEM AND METHOD FOR REAL-TIME SYNCHRONIZATION OF MEDIA CONTENT VIA MULTIPLE DEVICES AND SPEAKER SYSTEMS

(71) Applicant: Julio Ferrer, Oak Park, CA (US)

(72) Inventor: Julio Ferrer, Oak Park, CA (US)

(*) Notice: Subject to any disclaimer, the term of this patent is extended or adjusted under 35 U.S.C. 154(b) by 138 days.

(21) Appl. No.: 16/062,616

(22) PCT Filed: Mar. 24, 2017

(86) PCT No.: PCT/US2017/024121
§ 371 (c)(1),
(2) Date: Jun. 14, 2018

(87) PCT Pub. No.: WO2017/161383
PCT Pub. Date: Sep. 21, 2017

(65) Prior Publication Data
US 2019/0007725 A1    Jan. 3, 2019

Related U.S. Application Data

(60) Provisional application No. 62/287,319, filed on Jan. 26, 2016.

(51) Int. Cl.
*G06F 15/16* (2006.01)
*H04N 21/43* (2011.01)
(Continued)

(52) U.S. Cl.
CPC ......... *H04N 21/4305* (2013.01); *G10L 25/81* (2013.01); *G10L 25/84* (2013.01);
(Continued)

(58) Field of Classification Search
CPC ... H04L 65/601; H04L 65/4069; H04L 67/42; H04L 67/1095; H04N 21/2668; H04N 21/4122; H04N 21/4126
See application file for complete search history.

(56) References Cited

U.S. PATENT DOCUMENTS

| 7,873,982 B2 | 1/2011 | Smith et al. |
| 2002/0053078 A1 | 5/2002 | Holtz et al. |

(Continued)

FOREIGN PATENT DOCUMENTS

| EP | 2790337 | 10/2014 |
| NO | 2012048928 | 4/2012 |

(Continued)

OTHER PUBLICATIONS

EP Search Report (7 pages) dated Oct. 28, 2019 for EP 17767712.7 (EP 3446488) in the name of Julio Ferrer entitled System and Method for Real-Time Synchronization of Media Content Via Multiple Devices and Speaker Systems.

(Continued)

*Primary Examiner* — Yves Dalencourt
(74) *Attorney, Agent, or Firm* — Fish IP Law, LLP

(57) ABSTRACT

A method for synchronizing media content via multiple device and speaker system includes: reading, by a server-side computing device, audio layout file comprising audio discreet channel mapped to speaker system, reading channel-based, object-based, scene-based, 3d audio, and audio layout files, receiving and processing, by a server-side computing device, head-related impulse response signal, head-transfer function signal, reverberant environment binaural room impulse signal, numerically simulated signal, and other binaural signal via sensors, receiving and processing, by the server-side computing device, bandpass transfer function, headphone transfer function, compensation filters, equalization filters, and other DSP algorithm, evaluating and processing encoding and decoding of media content, and transmitting the server-side message or packet to be used by the client device along with previously received customized stock media content and customized media content, to substantially synchronize the client-side playback of syn- (Continued)

chronized media content with server-side playback of the stock media content in client device and speaker system.

18 Claims, 10 Drawing Sheets

(51) Int. Cl.
| | |
|---|---|
| H04N 21/20 | (2011.01) |
| H04N 21/6332 | (2011.01) |
| H04N 21/422 | (2011.01) |
| H04N 21/475 | (2011.01) |
| H04N 21/81 | (2011.01) |
| H04N 21/658 | (2011.01) |
| H04N 21/426 | (2011.01) |
| G10L 25/81 | (2013.01) |
| G10L 25/84 | (2013.01) |
| H04N 21/258 | (2011.01) |
| H04N 21/442 | (2011.01) |

(52) U.S. Cl.
CPC ....... *H04N 21/20* (2013.01); *H04N 21/25891* (2013.01); *H04N 21/42202* (2013.01); *H04N 21/42684* (2013.01); *H04N 21/4307* (2013.01); *H04N 21/44222* (2013.01); *H04N 21/4755* (2013.01); *H04N 21/6332* (2013.01); *H04N 21/658* (2013.01); *H04N 21/8106* (2013.01)

(56) References Cited

U.S. PATENT DOCUMENTS

| | | |
|---|---|---|
| 2003/0084442 A1 | 5/2003 | Kellner et al. |
| 2006/0002681 A1 | 1/2006 | Spilo et al. |
| 2008/0022320 A1* | 1/2008 | Ver Steeg .......... H04N 21/2353 |
| | | 725/78 |
| 2008/0071399 A1 | 3/2008 | Baird |
| 2009/0010283 A1 | 1/2009 | Lin et al. |
| 2009/0228920 A1 | 9/2009 | Tom et al. |
| 2010/0061695 A1* | 3/2010 | Furmanski ........... G11B 27/034 |
| | | 386/278 |
| 2010/0241256 A1* | 9/2010 | Goldstein ................ H04R 5/04 |
| | | 700/94 |
| 2012/0144435 A1 | 6/2012 | Spilo et al. |
| 2013/0263182 A1 | 10/2013 | Ivy et al. |
| 2014/0040930 A1 | 2/2014 | Gates, III et al. |
| 2014/0071342 A1 | 3/2014 | Winograd et al. |
| 2014/0079241 A1 | 3/2014 | Chan et al. |
| 2014/0081767 A1 | 3/2014 | Zhang |
| 2014/0082660 A1 | 3/2014 | Zhang et al. |
| 2014/0115631 A1 | 4/2014 | Mak |
| 2014/0153727 A1 | 6/2014 | Walsh et al. |
| 2014/0186010 A1 | 7/2014 | Guckenberger et al. |
| 2014/0240597 A1 | 8/2014 | Garner et al. |
| 2014/0372464 A1 | 12/2014 | Wood |

FOREIGN PATENT DOCUMENTS

| | | |
|---|---|---|
| NO | 2014111829 | 7/2014 |
| WO | 2012048928 | 4/2012 |
| WO | 2014111829 | 7/2014 |

OTHER PUBLICATIONS

EP Search Report (7 pages) dated Oct. 18, 2019 for EP 17767712.7 (EP 3446388) in the name of Julio Ferrer entitled"System and Method for Real-Time Synchronization of Media Content Via Multiple Devices and Speak systems".

* cited by examiner

SYSTEM AND METHOD FOR REAL-TIME SYNCHRONIZATION OF MEDIA CONTENT VIA MULTIPLE DEVICES AND SPEAKER SYSTEMS

This invention relates to a method and system for synchronization via one or more electronic device of one or more media content. Particularly, the invention relates to a method and system for synchronization via one or more electronic device and speaker system of one or more media content. More particularly, the invention relates to a method and system for synchronization via one or more electronic device and speaker system of one or more audio and video content. More particularly, the invention relates to a method and system for real-time synchronization via one or more electronic device and speaker system of one or more audio and video content. More particularly, the invention relates to a method and system for real-time synchronization via one or more electronic device and speaker system of one or more audio and video content within and around one or more venue, public, office, school and home environment. Specifically, the invention relates to a method and system for real-time synchronization via one or more electronic device and speaker system of one or more audio and video content within and around one or more venue, public, office, school and home environment over a communications network. The invention provides two different alternative methods, to which we respectively refer in shorthand as the baseline method and live method.

According to embodiments of the invention, a platform is provided for the synchronization of one or more audio content, video content, and other data during playback of content. For example, the content may be digital content. For example, the content may be another type of content other than digital content. For example, the content may be accessed by a user using a client-side device. For example, the content may be accessed by the user using a speaker system. For example, the content may be accessed by the user using one or more of one or more client-side device and speaker system. For example, the content may be accessed by the user using one or more of one or more visual sensor, thermal sensor, vibratory sensor, position sensor, and an other sensor. For example, position sensor may comprise one or more head motion tracking sensor, eye motion tracking sensor, haptic sensor, and an other position sensor. For example, the content may be accessed by the user over a network. For example, the audio content may comprise one or more customized audio content, binaural audio content, and alternative audio content. For example, the binaural audio content may comprise one or more of one or more head-related impulse response (HRIR) signal, head-related transfer function (HRTF) signal, reverberant environment binaural room impulse response (BRIR) signal, and an other binaural signal. For example, the binaural audio content may comprise one or more of one or more HRIR signal in time domain, HRTF in frequency domain, BRIR, a numerically simulated signal by room acoustical simulation based on virtual 3d models of one or more of virtual environments, and an other binaural signal. For example, one or more HRIR, HRTF, BRIR, numerically simulated signal, and an other binaural signal may be convolved in real time with media content to produce one or more binaural audio content. For example, the audio content may utilize one or more bandpass transfer function, headphone transfer function (HpTF), compensation filters, equalization filters, and an other DSP algorithm, so as to regularize audio signals, and adjust one or more timber, spectral cue, localization, and an other attribute of sound. For example, the video content may comprise one or more customized audio content, customized video content, and alternative video content. For example, alternative video content may comprise of customized video content with associated metadata describing one or more sound source positioning, and an other spatial property.

In particular, according to further embodiments of the invention, one or more audio content, video content, and an other data synchronize with on-screen video. For example, the on-screen video may be projected using one or more digital projector, hologram projector, computer, television, console, headset, an other projection device, and an other reception device. The synchronization is performed by one or more of one or more computer algorithm, clock and sensor. Alternatively, or additionally, the system receives synchronization input from one or more of one or more user and designer.

According to further embodiments of the invention, a method for real-time customization and synchronization of stock media content includes: receiving, by a client-side device under a user's control, stock media content selected by the user to be customized and played on the client-side device in coordination with server-side playback of the stock media content by a server-side computing device; obtaining, by the client-side device, customization preferences of the user; customizing the stock media content, by the client-side device, using the customization preferences, so as to create customized media content; creating, by the client-side device, a client-side message or packet comprising one or more of a client-side unique identifier and a client-side start host time (CSHT); sending, by the client-side device, the client-side message or packet to the server-side computing device; receiving and processing, by a client-side device, a server-side message or packet comprising one or more of a server-side unique identifier, the CSHT, a server-side start host time (SSHT), a server-side end host time (SEHT), and a server-side running media play time (SRMPT) and substantially synchronizing in real-time, by the client-side device, using one or more of the server-side unique identifier, the CSHT, the SSHT, the SEHT, and the SRMPT, client-side playback of the customized media content with server-side playback of the stock media content; receiving and processing, by a client-side device, one or more of one or more head-related impulse response (HRIR) signal, head-related transfer function (HRTF) signal, reverberant environment binaural room impulse response (BRIR) signal, numerically simulated signal, and an other binaural signal utilizing one or more of one or more visual sensor, thermal sensor, vibratory sensor, position sensor, and an other sensor; receiving and processing, by a client-side device, one or more bandpass transfer function, headphone transfer function (HpTF), compensation filters, equalization filters, and an other DSP algorithm; and playing back, by the client-side device, the synchronized customized media content. For example, the customized content may comprise that which is described in United States Applications Number or PCT International Application Number PCT/US15/45144 filed Aug. 13, 2015 entitled "System and Method for Real-Time Customization and Synchronization of Media Content", with priority benefit of U.S. provisional patent application No. 62/036,834 filed Aug. 13, 2014 and entitled "Computer-Readable Medium, System and Method for Real-Time Customization and Synchronization of Media Content", which are hereby incorporated by reference in their entirety.

According to still further embodiments of the invention, a method for customizing media content pursuant to a method for real-time customization and synchronization of stock media content includes: reading, by a server-side computing device, an audio layout file comprising one or more audio discreet channel mapped to one or more speaker system located in one or more venue, public, office, school and home environment; reading, by a server-side computing device, one or more channel-based, object-based, scene-based, 3d audio file, and audio layout files with audio routing settings such that may describe one or more of speaker-independent representation of a sound field, source position, and an other spatial sound; evaluating and verifying, by the server-side computing device, the amount of channels in the layout file that match the number of channels set for audio output to one or more speaker system; evaluating and processing, by the server-side computing device, one or more encoding and decoding of one or more media content using one or more encoder matrix, decoder matrix, numerical computing algorithm, spatial audio renderer, and third party plug-in; receiving and processing, by a server-side computing device, from a client-side device under a user's control, a client-side message or packet from the client-side device comprising one or more of a client-side unique identifier, and a client-side start host time (CSHT); creating, by the server-side computing device, a server-side message or packet comprising one or more of a server-side unique identifier comprising a copy of the client-side unique identifier, the CSHT, a server-side start host time (SSHT), a server-side end host time (SENT), and a server-side running media play time (SRMPT); transmitting the server-side message or packet to the client-side device, by the server-side computing device, to be used by the client-side device along with previously received stock media content selected by a user to be customized, and customized media content previously created using customization preferences obtained from a user, to substantially synchronize in real-time, using the CSHT, client-side playback of the customized media content with server-side playback of the stock media content; and playing back, by the server-side computing device, the synchronized stock media content in one or more of one or more client-side device and speaker system.

According to yet further embodiments of the invention, a method for receiving and processing a server-side message or packet and synchronizing one or more clocks comprised in a client-side device under a user's control with one or more server-side clocks pursuant to a method for real-time customization and synchronization of stock media content includes: receiving, by the client-side device, a server-side message or packet from the server-side master application, the server-side message or packet comprising one or more of a server-side unique identifier, a client-side start host time (CSHT), a server-side start host time (SSHT), a server-side end host time (SENT), and a server-side running media play time (SRMPT); reading, by the client-side device, the server-side message or packet into one or more client-side buffers; recording, by the client-side device, a client-side end host time (CEHT); evaluating and verifying, by the client-side device, integrity of the server-side message or packet by comparing the CEHT and the SENT; calculating a half-round-trip time (HRT), by the client-side device, using one or more of the CEHT, CSHT, SEHT, and SSHT; reading, by the client-side device a value of the SRMPT; calculating, by the client-side device, using one or more of CEHT, CSHT, SEHT, SSHT, SRMPT, and HRT, a playback offset time $T_{PO}$; computing, by the client-side device, using one or more of the $T_{PO}$ and the SRMPT, a client-side running media play time (CRMPT); receiving and processing, by the client-side device, one or more of one or more head-related impulse response (HRIR) signal, head-related transfer function (HRTF) signal, reverberant environment binaural room impulse response (BRIR) signal, numerically simulated signal, and an other binaural signal utilizing one or more of one or more visual sensor, thermal sensor, vibratory sensor, position sensor, and an other sensor; receiving and processing, by the client-side device, one or more bandpass transfer function, headphone transfer function (HpTF), compensation filters, equalization filters, and an other DSP algorithm; and substantially synchronizing, by the client-side device, using one or more of the CRMPT and the $T_{PO}$, client-side playback of synchronized customized media content to server-side playback of stock media content in one or more of one or more client-side device and speaker system.

According to further still embodiments of the invention, a method for receiving and processing a server-side message or packet and synchronizing one or more clocks comprised in a client-side device under a user's control with one or more server-side clocks pursuant to a method for real-time customization and synchronization of stock media content includes: receiving, by the client-side device, a server-side message or packet from the server-side master application at one or more pre-determined interval during playback of content, the server-side message or packet comprising one or more of a server-side unique identifier, a client-side start host time (CSHT), a server-side start host time (SSHT), a server-side end host time (SEHT), and a server-side running media play time (SRMPT); reading, by the client-side device, the server-side message or packet into one or more client-side buffers; recording, by the client-side device, a client-side end host time (CEHT); evaluating and verifying, by the client-side device, integrity of the server-side message or packet by comparing the CEHT and the SENT; calculating a half-round-trip time (HRT), by the client-side device, using one or more of the CEHT, CSHT, SEHT, and SSHT; reading, by the client-side device a value of the SRMPT; calculating, by the client-side device, using one or more of CEHT, CSHT, SEHT, SSHT, SRMPT, and HRT, a playback offset time $T_{PO}$; computing, by the client-side device, using one or more of the $T_{PO}$ and the SRMPT, a client-side running media play time (CRMPT); receiving and processing, by the client-side device, one or more of one or more head-related impulse response (HRIR) signal, head-related transfer function (HRTF) signal, reverberant environment binaural room impulse response (BRIR) signal, numerically simulated signal, and an other binaural signal utilizing one or more of one or more visual sensor, thermal sensor, vibratory sensor, position sensor, and an other sensor; receiving and processing, by the client-side device, one or more bandpass transfer function, headphone transfer function (HpTF), compensation filters, equalization filters, and an other DSP algorithm; and substantially synchronizing, by the client-side device, using one or more of the CRMPT and the $T_{PO}$, client-side playback of synchronized customized media content to server-side playback of stock media content in one or more of one or more client-side device and speaker system.

According to yet still embodiments of the invention, a method for receiving and processing a server-side message or packet and synchronizing one or more clocks comprised in a client-side device under a user's control with one or more server-side clocks pursuant to a method for real-time customization and synchronization of stock media content includes: receiving, by the server-side computing device, a client-side message or packet from the client-side master application at one or more pre-determined interval during playback of content, the client-side message or packet comprising one or more of a server-side unique identifier, a client-side start host time (CSHT), a server-side start host time (SSHT), a server-side end host time (SENT), and a server-side running media play time (SRMPT); reading, by the client-side device, the server-side message or packet into one or more client-side buffers; recording, by the client-side device, a client-side end host time (CEHT); evaluating and verifying, by the client-side device, integrity of the server-side message or packet by comparing the CEHT and the SENT; calculating a half-round-trip time (HRT), by the client-side device, using one or more of the CEHT, CSHT, SEHT, and SSHT; reading, by the client-side device a value of the SRMPT; calculating, by the client-side device, using one or more of CEHT, CSHT, SEHT, SSHT, SRMPT, and HRT, a playback offset time $T_{PO}$; computing, by the client-side device, using one or more of the $T_{PO}$ and the SRMPT, a client-side running media play time (CRMPT); receiving and processing, by the client-side device, one or more of one or more head-related impulse response (HRIR) signal, head-related transfer function (HRTF) signal, reverberant environment binaural room impulse response (BRIR) signal, numerically simulated signal, and an other binaural signal utilizing one or more of one or more visual sensor, thermal sensor, vibratory sensor, position sensor, and an other sensor; receiving and processing, by the client-side device, one or more bandpass transfer function, headphone transfer function (HpTF), compensation filters, equalization filters, and an other DSP algorithm; and substantially synchronizing, by the client-side device, using one or more of the CRMPT and the $T_{PO}$, client-side playback of synchronized customized media content to server-side playback of stock media content in one or more of one or more client-side device and speaker system.

According to other embodiments of the invention, a method for synchronizing one or more clocks comprised in a server-side computing device pursuant to a method for real-time customization and synchronization of stock media content includes: calculating and recording, by the server-side computing device, a server-side start host time (SSHT) of stock media content; creating, by the server-side computing device, a server-side audio stimulus, the server-side audio stimulus comprising one or more of one or more speech, music, noise, frequency log sweep, sine sweep, and an other audio stimulus; sending, by the server-side computing device, to one or more ith speaker, one or more of a server-side message, packet, digital signal, and analogue signal, comprising one or more server-side audio stimulus, to one or more ith speaker; reading and processing, by the server-side computing device, via one or more microphone system and an other receiver device, audio data within one or more of one or more frame and sequence of frames of media content, and cross-correlate, by a pattern match algorithm, the audio data; reading and recording, by the server-side computing device, a server-side end host time (SEHT) of media content for each ith speaker; calculating, by the server-side computing device, using one or more of (SSHT) and (SEHT), a playback offset time $T_{PO}$ for the longest delay interval of each ith speaker; evaluating and recording, by the server-side computing device, the longest delay interval of each ith speaker; and substantially synchronizing, by the server-side computing device, using one or more of the SRMPT and the $T_{PO}$, the server-side playback of stock media content with and for each ith speaker. The server-side computing device may further adjust the playback offset time $T_{PO}$ by calculating system latencies introduced in each ith speaker feed, using one or more bandpass transfer function, headphone transfer function (HpTF), compensations filters, equalization filters, and an other DSP algorithm. In addition, the pattern match algorithm may separate one or more of audience noise and an other noise from the signal captured by one or more microphone system.

According to further embodiments, the server-side computing device may substantially synchronize, using one or more of SRMPT and the $T_{PO}$, the server-side playback of stock media content with and for each ith speaker in a zone or group defined by one or more speaker system.

According to other embodiments, a configuration file with a room response may be used in the calculation of time offsets for each ith speaker.

According to further embodiments of the invention, a server-side computing device for synchronizing media content includes: a processor; data storage operably connected with the processor; memory operably connected with the processor, the memory comprising one or more of a server-side master application, a server-side customization application, and a server-side streaming application; a server-side playback device operably connected with the processor; a server-side computing device operably connected with the processor and configured to communicate over one or more of one or more network and input and output (I/O) device; a server-side computing device operably connected with the processor and configured to communicate over one or more of one or more network and input and output (I/O) device to one or more sensor system, speaker system, microphone system, and an other audio transducer; and a server-side local interface operably connected with the processor and configured to communicate over a network with a client-side device under a user's control; the server-side master application configured to receive over the network from the client-side device a message or packet comprising stock media content selected by the user; the server-side customization application configured to obtain customization preferences of the user; the server-side customization application further configured to customize the stock media content, using the customization preferences of the user, so as to create customized media content; the server-side local interface configured to transmit to the client-side device via the network server-side timing information and the customized media content so that the client-side device substantially synchronizes with its playback of the customized media content a playback by the server-side playback device of the stock media content.

DESCRIPTION OF THE DRAWINGS

FIG. 3 applies to the baseline method viewed from the client side.

FIG. 4 applies to the baseline method and live method viewed from the server side.

FIG. 5 applies to the baseline method viewed on the server side.

FIG. 6 applies to the live method viewed from the client side.

FIG. 7 applies to the live method viewed from the server side.

FIG. 8 provides more detail regarding sub-steps of step 360 in FIG. 3 for the baseline method.

FIG. 9 provides more detail regarding sub-steps of step 545 in FIG. 5 for the baseline method.

FIG. 10 applies to the baseline method and live method viewed from the server side.

DETAILED DESCRIPTION

Figure 1:
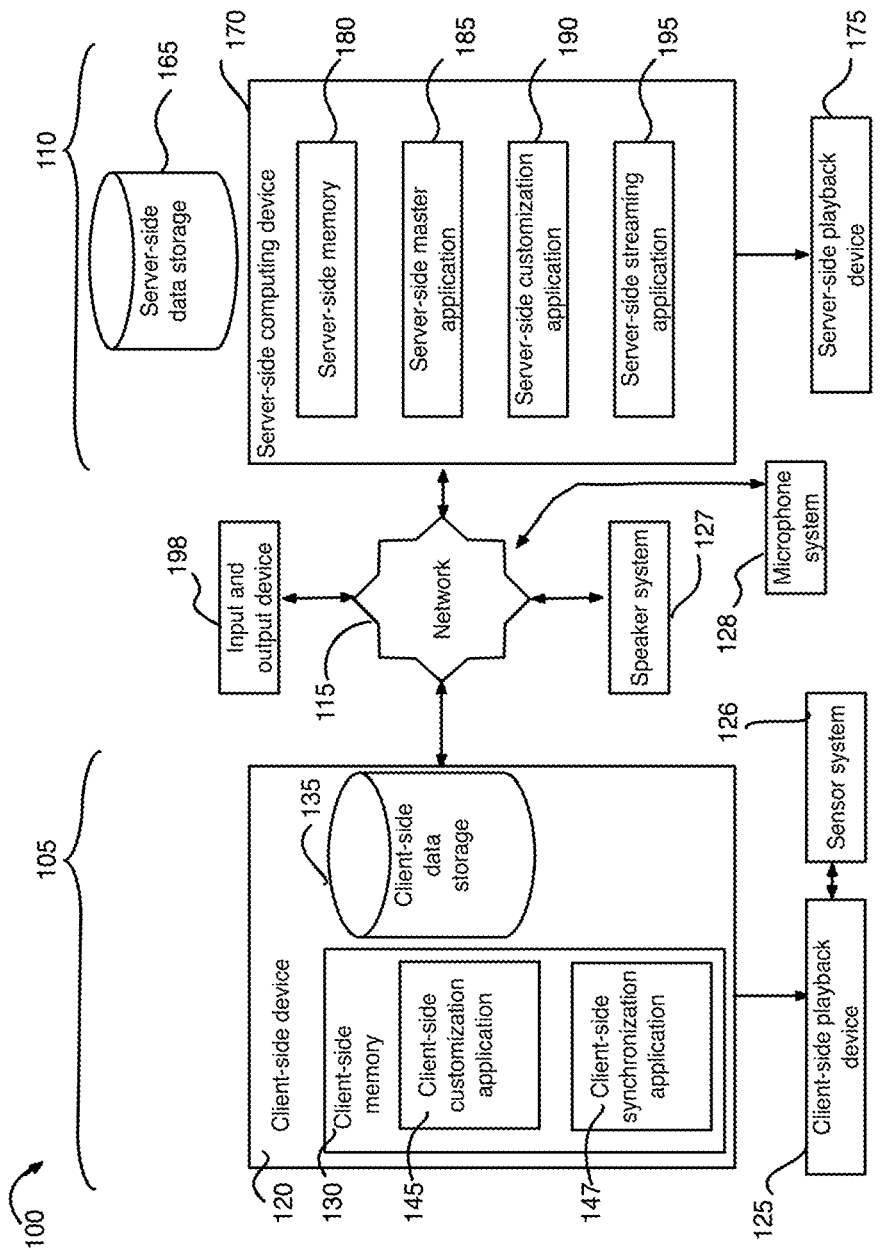
FIG. 1 is a schematic block diagram of a networked environment for real-time synchronization via one or more electronic device and speaker system of media content.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system for the synchronization via one or more electronic device of one or more of media content includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system for the synchronization via one or more speaker system include a plurality of components such as one or more input and output (I/O) device, analogue to digital and digital to analogue device (AD/DA), amplifier device, active and passive speaker systems, and an other electronic device.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

FIG. 1 is a schematic block diagram of a networked environment 100 for real-time customization and synchronization of media content via one or more of one or more electronic device, that comprises client-side networked environment 105, server-side networked environment 110, and network 115. Network 115 comprises one or more of one or more speaker system 127, microphone system 128, input and output (I/O) device 198, Internet, private virtual network, extranet, fiber optic network, wide area network (WAN), local area network (LAN), wired network, wireless network, and an other type of network.

Client-side networked environment 105 comprises client-side device 120 and client-side playback device 125 that is operably connected with client-side device 120. Client-side device 120 comprises, for example, one or more of one or more tablet 120, phone 120, smart device 120, virtual reality headset 120, augmented reality headset 120, computer program 120, computer browser 120, media player 120, game console 120, virtual device 120, and an other computing device 120.

Client-side device 120 runs one or more applications. Client-side device 120 deploys over network 115.

Client-side playback device 125 is configured to play media content. For example, client-side playback device 125 plays media content received from client-side device 120. Alternatively, or additionally, client-side playback device 125 plays media content received directly over network 115. For example, client-side playback device 125 comprises one or more of one or more headphone 125, earphone 125, earbud 125, earworn wearable 125, screen 125, television 125, monitor 125, in-venue projector 125, home theater 125, three-dimensional digital projector 125, and an other client-side playback device 125. For example, client-side playback device 125 comprises one or more of one or more open headphone 125, semi-open headphone 125, closed headphone 125, and an other type of headphone 125.

Client-side playback device 125 operates in an environment with sensor system 126. For example, sensor system 126 comprises one or more of one or more visual sensor 126, thermal sensor 126, vibratory sensor 126, position sensor 126, and an other sensor 126. For example, the sensor system 126 comprises one or more of one or more head motion tracking sensor 126, eye motion tracking sensor 126, haptic sensor 126, and an other position sensor 126. For example, the sensor system 126 may comprise a spatial resolution of two degrees of freedom in all directions so as to provide one or more smooth audio transitioning and stable sound imaging.

Client-side playback device 125 operates in an environment with speaker system 127. For example, client-side playback device 125 operates in an environment with one or more of one or more channel-based speaker system 127, object-based speaker system 127, scene-based speaker system 127, 3d audio speaker system 127, and an other speaker system 127 environment. For example, client-side playback device 125 operates in one or more of single-channel speaker system 127 and multi-channel speaker system 127 environment. For example, single-channel speaker system 127 and multi-channel speaker system 127 may comprise one or more location of one or more speakers in one or more designed position and zone within a physical space. For example, client-side playback device 125 may operate in an object-based speaker environment. For example, the object-based speaker system 127 may contain one or more of an object (e.g. sound sources) that contains metadata describing the intended object position and other spatial properties. For example, client-side playback device 125 may operate in a scene-based speaker system 127 environment. For example the, the scene-based speaker system 127 may use one or more of spherical harmonic basis function that describes how the sound pressure in media content changes as a function of time and direction. For example, client-side playback device 125 operates in an environment with one or more speaker 127. For example, speaker system 127 may comprise one or more of one or more woofer, such as to cover low-frequency range, tweeter, such as to cover high-frequency range, and an other audio transducer.

Client-side playback device 125 operates in an environment with microphone system 128. For example, microphone system 128 may comprise one or more of one or more microphone array, spot microphone, and an other microphone system.

Client-side device 120 comprises one or more client-side memory 130 and client-side data storage 135.

Client-side memory 130 is defined herein as including both volatile and nonvolatile memory and data storage components. For example, client-side memory 130 comprises one or more client-side buffers. Volatile components are those that do not retain data values upon loss of power. Nonvolatile components are those that retain data upon loss of power. For example, client-side memory 130 may comprise one or more random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, RAM may comprise one or more static random access memory (SRAM), dynamic random access memory (DRAM), magnetic random access memory (MRAM), and other forms of RAM. For example, ROM may comprise one or more programmable read-only memory (PROM), erasable programmable read-only memory (EPROM), electrically erasable programmable read-only memory (EEPROM), and other forms of ROM.

Client-side memory 130 comprises one or more client-side customization application 145, and client-side synchronization application 147.

Client-side memory 130 further comprises a client-side device unique identifier. The client-side device unique identifier is a number unique to this particular device. In other words, each device in the world will have its own number that no other such device will have. A copy of the client-side device unique identifier, known as a client-side unique identifier, will be transmitted by the client-side device 120 in a message or packet to the server-side computing device 170. Then a copy of the client-side transmitted unique identifier, known as a server-side unique identifier, will be transmitted back from the server-side computing device 170 to the client-side device 120. The server-side unique identifier received by the client-side device 120 will then be compared with the client-side device unique identifier to help determine the integrity of the messages and as a security check.

Optionally, the client-side memory 130 further comprises an other client-side application (not pictured). The other client-side application comprises one or more additional client-side application, additional client-side service, additional client-side process, and additional client-side functionality. For example, an other client-side application runs background services. For example, an other client-side application runs boot processes. For example, an other client-side application runs other client-side applications.

Client-side data storage 135 comprises one or more single database, multiple database, cloud application platform, relational database, no-sequel database, flash memory, solid state memory, and an other client-side data storage device. Client-side data storage 135 may be located in a single installation that may be local to the server-side computing device 170. Alternatively, client-side data storage 135 may be located in a single installation that may be local to the client-side device 120. Alternatively, client-side data storage 135 may be distributed in a plurality of locations. Client-side data storage 135 may be distributed in a plurality of geographical locations. Client-side data storage 135 may be distributed in a plurality of geographical locations located in the same time zone. Client-side data storage 135 may be distributed in a plurality of geographical locations, wherein not all the geographical locations are located in the same time zone.

Client-side data storage 135 comprises one or more of item prices, order information, media content, and other information. For example, the media content comprises one or more of an audio track, a video track, an other media track, a motion picture, a commercial, a motion picture trailer, a demonstration ("demo"), a commentary, extra content, and an other form of additional content. The media content comprises one or more of media data, media content files, and other media content. The motion picture comprises one or more of a feature-length theatrical production, short-film production, an animated production, a broadcast television production, a pay television production, a documentary, a commercial, a trailer, and an other motion picture. The media data comprises one or more audio track, multi-channel track, commentary, and other media data. The audio track comprises one or more English language audio track, audio track in a language other than English, and customized audio track. The commentary comprises one or more commentary by one or more directors of a motion picture, a commentary by one or more actors in a motion picture, a commentary by contributors to a motion picture other than the directors and actors, and commentary by persons other than contributors to a motion picture.

Client-side customization application 145 is configured to store media content. For example, client-side customization application 145 stores playable media content in client-side data storage 135. The playable media content comprises one or more segmented media content track, non-segmented media content track, and an other playable media content. Optionally, client-side customization application 145 performs media processing of the playable media content. For example, client-side customization application 145 passes the playable media content through one or more of bandpass transfer function, headphone transfer function (HpTF), compensation filters, equalization filters, and an other DSP algorithm, to regularize audio signals, and adjust one or more timber, spectral cue, localization, and an other attribute of sound. For example, HpTF may be used to one or more smooth, accentuate and cancel fluctuations in the low, mid and high frequencies of one or more headphone. For example, client-side customization application 145 automatically uploads a pre-determined HpTF to one or more headphone. For example, client-side customization application 145 may receive headphone data (e.g. model, serial number and other identifying information) and upload from client-side data storage 135 a customized HpTF for one or more headphone. For example, client-side customization application 145 may determine delay-processing time of these upload functions and adjust the client-side playback to compensate.

For example, client-side customization application 145 parses the playable media content into a chronological sequence that substantially matches the sequence of the motion picture. For example, client-side customization application 145 writes the playable media content to one or more of client-side data storage 135 and client-side memory 130. For example, client-side customization application 145 writes the playable media content to a media content file located in one or more client-side data storage 135 and client-side memory 130.

Client-side synchronization application 147 is configured to connect with server-side networked environment 110 so as to substantially synchronize between server-side networked environment 110 and client-side device 120 media content played on client-side playback device 125. Client-side playback device 125 comprises one or more of one or more screen 125, television 125, monitor 125, cellular phone 125, laptop computer 125, desktop computer 125, notebook 125, tablet 125, headset 125, channel-based playback system 125, object-based playback system 125, scene-based playback system 125, 3$d$ audio playback system 125, and an other client-side playback device 125. Client-side playback device 125 plays for the user one or more audio media content, video media content, and an other form of media content. For example, networked environment 100 may be synchronized with other sensory experiences such as, for example, one or more smoke effects, water droplets, moving chairs, and the like. For example, more than one client-side playback device 125 may be used simultaneously.

As explained below in greater detail, particularly in FIG. 8, client-side synchronization application 147 is configured to perform one or more of sampling and recording a client-side running media play time (CRMPT) at which the client-side media player plays the media on the client. The CRMPT is defined as an elapsed running time for customized media content that is being played by the client-side media player on the client. If no customized media content is being played by the client-side media player, the CRMPT is defined as zero. The CRMPT recorded by client-side synchronization application 147 represents a real world time value based on the host system clock of the client. Then, client-side synchronization application 147 creates a client-side message or packet that it transmits to server-side networked environment 110.

Server-side networked environment 110 comprises server-side data storage 165, server-side computing device 170 that is operably connected with server-side data storage 165, and server-side playback device 175 that is operably connected with server-side data storage 165. Server-side data storage 165 is a second location where, as mentioned above in relation to client-side data storage 135, client-side customization application 145 may store the playable media content.

Server-side data storage 165 comprises one or more of item prices, order information, media content, and other information. For example, the media content files comprise one or more of one or more audio track, video track, an other media track, motion picture, commercial, motion picture trailer, demonstration ("demo"), commentary, extra content, and an other form of additional content. The media content comprises one or more media data, media content files, and other media content. The motion picture comprises one or more of one or more feature-length theatrical production, short-film production, animated production, broadcast television production, pay television production, documentary, commercial, trailer, and an other motion picture. The media data comprises one or more of one or more audio track, multi-channel track, commentary, and other media data. The audio track comprises one or more of one or more English language audio track, audio track in a language other than English, and customized audio track. The commentary comprises one or more commentary by one or more director of a motion picture, commentary by one or more actor in a motion picture, commentary by contributors to a motion picture other than the directors and actors, and commentary by persons other than contributors to a motion picture.

Server-side data storage 165 comprises one or more single database, multiple database, cloud application platform, relational database, no-sequel database, flash memory, solid state memory, and an other server-side data storage device. Server-side data storage 165 may be located in a single installation that may be local to client-side device 120. Alternatively, server-side data storage 165 may be located in a single installation that may be local to server-side computing device 170. Alternatively, server-side data storage 165 may be distributed in a plurality of locations. Server-side data storage 165 may be distributed in a plurality of geographical locations. Server-side data storage 165 may be distributed in a plurality of geographical locations located in the same time zone. Server-side data storage 165 may be distributed in a plurality of geographical locations, wherein not all the geographical locations are located in the same time zone.

Server-side computing device 170 comprises one or more server, computer, cloud-computing device, and distributed computing system.

Server-side computing device 170 may be located in a single installation. Alternatively, server-side computing device 170 may be distributed in a plurality of geographical locations. For example, server-side computing device 170 may be distributed in a plurality of geographical locations located in the same time zone. For example, server-side computing device 170 may be distributed in a plurality of geographical locations wherein not all the geographical locations are located in the same time zone.

Server-side playback device 175 is configured to play media content. For example, server-side playback device 175 plays media content received from server-side computing device 170. Alternatively, or additionally, server-side playback device 175 plays media content received directly over network 115. For example, server-side playback device 175 comprises one or more of one or more in-venue projector 175, home theater 175, television 175, monitor 175, three-dimensional digital projector 175, and an other device 175.

Server-side playback device 175 operates in an environment with speaker system 127. For example, server-side playback device 175 operates in an environment with one or more of one or more channel-based speaker system 127, object-based speaker system 127, scene-based speaker system 127, 3$d$ audio speaker system 127, and an other speaker system 127 environment. For example, server-side playback device 175 operates in one or more of single-channel speaker system 127 and multi-channel speaker system 127 environment. For example, single-channel speaker system 127 and multi-channel speaker system 127 may comprise one or more location of one or more speakers in one or more designed position and zone within a physical space. For example, server-side playback device 175 may operate in an object-based speaker environment. For example, the object-based speaker system 127 may contain one or more of an object (e.g. sound sources) that contains metadata describing the intended object position and other spatial properties. For example, server-side playback device 175 may operate in a scene-based speaker system 127 environment. For example the, the scene-based speaker system 127 may use one or more of spherical harmonic basis function that describes how the sound pressure in media content changes as a function of time and direction. For example, server-side playback device 175 operates in an environment with one or more speaker 127. For example, speaker system 127 may comprise one or more of one or more woofer, such as to cover low-frequency range, tweeter, such as to cover high-frequency range, and an other audio transducer.

Server-side playback device 175 is configured to communicate with server-side computing device 170. For example, server-side playback device 175 communicates with server-side computing device 170 using one or more of one or more satellite, antenna, cable, network 115, and an other communication method. Server-side playback device 175 comprises one or more of one or more digital projector 175, hologram projector 175, screen 175, television 175, monitor 175, cellular phone 175, laptop computer 175, notebook 175, tablet 175, headset 175, multi-channel playback system 175, and an other server-side playback device 175.

Server-side computing device 170 comprises server-side memory 180. Server-side memory 180 is defined herein as including both volatile and nonvolatile memory and data storage components. For example, server-side memory 180 comprises one or more server-side buffers. Volatile components are those that do not retain data values upon loss of power. Nonvolatile components are those that retain data upon loss of power. For example, server-side memory 180 may comprise one or more random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, RAM may comprise one or more static random access memory (SRAM), dynamic random access memory (DRAM), magnetic random access memory (MRAM), and other forms of RAM. For example, ROM may comprise one or more programmable read-only memory (PROM), erasable programmable read-only memory (EPROM), electrically erasable programmable read-only memory (EEPROM), and other forms of ROM.

The server-side computing device 170 comprises one or more of server-side master application 185, server-side customization application 190, and server-side streaming application 195. Server-side master application 185 is configured to provide synchronization timing information to one or more of client-side synchronization application 147, and server-side streaming application 195.

Optionally, server-side computing device 170 further comprises an other server-side application (not pictured). The other server-side application comprises one or more of additional server-side application, additional server-side service, additional server-side process, and additional server-side functionality.

For example, the other server-side application runs background services. For example, the other server-side application runs boot processes. For example, the other server-side application runs other server-side applications.

As explained below in greater detail, particularly in FIG. 9, server-side master application 185 is configured to perform one or more of sampling and recording server-side running media play time (SRMPT) at which the server-side media player plays the media on the server. The SRMPT is defined as an elapsed running time for customized media content that is being played by the server-side media player on the server. If no customized media content is being played by the server-side media player, the SRMPT is defined as zero. For example, the motion picture's SRMPT time might clock in at 6 minutes, 10 seconds, and 10 frames. The SRMPT recorded by server-side master application 185 represents a real world time value based on the host system clock of the server. Then, server-side master application 185 creates a server-side message or packet that it transmits to client-side synchronization application 147.

As explained below in greater detail, particularly in FIG. 10, server-side master application 185 is configured to store media content. For example, the server-side master application 185 stores playable media content in server-side data storage 165. The playable media content comprises one or more segmented media content track, non-segmented media content track, audio stimulus, and an other playable media content. Optionally, server-side master application 185 performs media processing of the playable media content. For example, the server-side master application 185 passes the playable media content through a pattern match algorithm to cross-correlate audio data within one or more frame and sequence of frames of playable media content to one or more ith speaker via one or more microphone system. For example, the server-side master application 185 may determine delay-processing time of this algorithm and adjust the server-side playback to compensate.

Server-side customization application 190 is configured to store playable media content to be played by server-side playback device 175. For example, server-side customization application 190 stores the playable media content in server-side data storage 165. Optionally, server-side customization application 190 performs media processing of the playable media content. For example, server-side customization application 190 passes the playable media content through one or more bandpass transfer function, compensation filters, equalization filters, and an other DSP algorithm, to regularize audio signals, and adjust one or more timber, spectral cue, localization, and an other attribute of sound. For example, server-side customization application 190 parses the playable media content into a chronological sequence that substantially matches the sequence of the motion picture. For example, server-side customization application 190 writes the playable media content to one or more server-side data storage 165 and server-side memory 180. For example, server-side customization application 190 writes the playable media content to a media content file located in one or more server-side data storage 165 and server-side memory 180.

Server-side streaming application 195 segments media content for deployment via network 115 to client-side device 120. Server-side streaming application 195 supports multiple alternate data streams, two or more of which can have different bit rates from each other. Server-side streaming application 195 also allows for client-side device 120 to switch streams intelligently as network bandwidth changes. Server-side streaming application 195 also provides for media encryption and user authentication over encrypted connections.

Speaker system 127 may receive audio via one or more server-side computing device 170, network 115, an analogue connection, and a digital connection. For example, speaker systems 127 may be one or more actively and passively used with amplifiers.

Microphone system 128, may receive audio via speaker system 127. Microphone system 128 may be placed on the wall, on the speaker, or within the venue environment.

Input and output (I/O) device 198 may receive audio via one or more directly from server-side computing device 170, over the network 115, an analogue connection, and a digital connection. For example, input and output (I/O) device 198 may perform one or more digital to analogue and analogue to digital conversions. For example, input and output (I/O) device 198 may route audio to one or more of one or more amplifier, speaker and an other electronic device.

Figure 2:
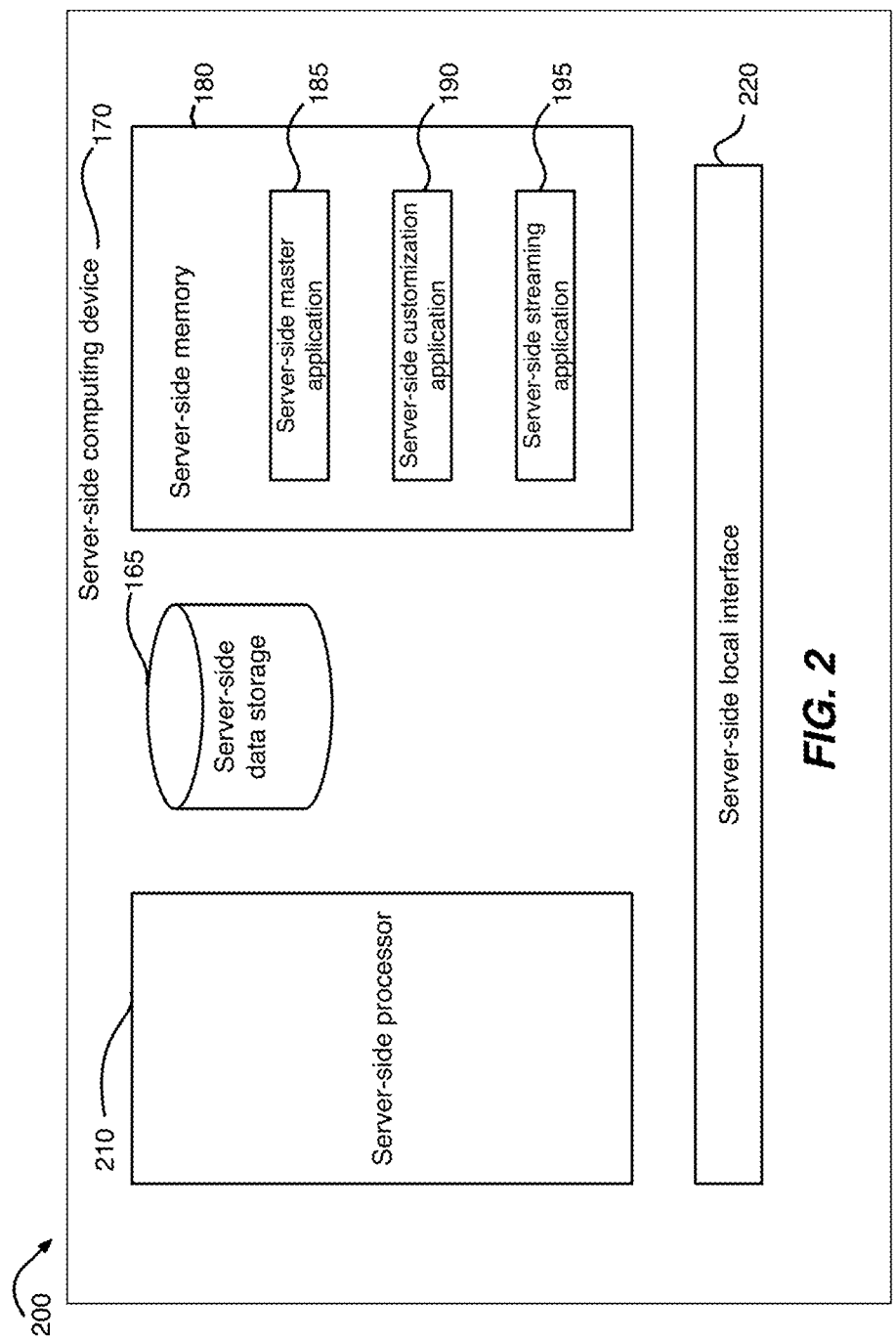
FIG. 2 is a schematic block diagram of the server-side computing device in an alternative configuration of a networked environment for real-time synchronization of media content via one or more electronic device and speaker system.

FIG. 2 is a schematic block diagram of server-side computing device 170 in an alternative configuration of a networked environment for real-time synchronization of media content via one or more of one or more electronic device and speaker system.

Server-side computing device 170 comprises one or more server-side data storage 165, server-side playback device 175 (not pictured), server-side memory 180, server-side processor 210, and server-side local interface 220. Server-side local interface 220 is operationally connected with one or more server-side data storage 165, server-side memory 180, and server-side processor 210. Server-side memory comprises one or more server-side master application 185, server-side customization application 190, and server-side streaming application 195. For example, server-side processor 210 comprises a server-side computer. For example, server-side local interface 220 comprises a bus. For example, server-side local interface 220 comprises a bus and further comprises one or more of an accompanying address/control bus or other bus structure.

Software components stored in one or more server-side memory 180 and server-side data storage 165 are executable by server-side processor 210. In this respect, the term executable means a program file that is in a form that can ultimately be run by server-side processor 210. For example, a compiled program is executable if it may be translated into machine code in a format that can be loaded into a random access portion of server-side memory 180 and run by server-side processor 210. For example, source code is executable if it may be expressed in a proper format, such as object code, that may be loaded into a random access portion of server-side memory 180 and run by server-side processor 210. For example, source code is executable if it may be interpreted by another executable program to generate instructions in a random access portion of server-side memory 180 and run by server-side processor 210. An executable program may be stored in one or more portions or components of server-side memory 180. For example, server-side memory 180 comprises one or more random access memory (RAM), read-only memory (ROM), hard disk drive, solid-state drive, USB flash drive, memory card, floppy disk, optical disc such as compact disc (CD) or digital versatile disc (DVD), magnetic tape, and other memory components.

One or more data and components stored in one or more server-side memory 180 and server-side data storage 165 are executable by server-side processor 210. For example, server-side processor 210 can execute one or more server-side master application 185, server-side customization application 190, and server-side streaming application 195.

For example, as an alternative to the setup in FIG. 1 with server-side data storage 165 separate from server-side computing device 170, server-side data storage 165 may be located in server-side computing device 170. For example, server-side data storage 165 may be located in server-side memory 180.

Server-side processor 210 comprises one or more processors. Server-side memory 180 comprises one or more memories. For example, server-side memory 180 comprises at least one memory configured to operate in a parallel processing circuit. In such a case, server-side local interface 220 may serve as network 115. For example, server-side local interface 220 may facilitate communication between two processors. For example, server-side local interface 220 may facilitate communication between a processor and a memory. For example, server-side local interface 220 may facilitate communication between two memories. Server-side local interface 220 may comprise additional systems designed to coordinate this communication. For example, server-side local interface 220 may comprise a system to perform load balancing. Server-side processor 210 may comprise an electrical processor. Alternatively, or additionally server-side processor 210 may comprise a non-electrical processor.

Any logic or application described herein, including but not limited to server-side master application 185, server-side customization application 190, and server-side streaming application 195 that comprises software or code can be embodied in any non-transitory computer-readable medium for use by or in connection with an instruction execution system such as, for example, server-side processor 210 in a computer system or other system. In this sense, the logic may comprise, for example, statements including instructions and declarations that can be fetched from the computer-readable medium and can be executed by the instruction execution system. In the context of the present disclosure, a computer-readable medium can be any medium that can contain, store, or maintain the logic or application described herein for use by or in connection with the instruction execution system. For example, the computer-readable medium may comprise one or more RAM, ROM, hard disk drive, solid-state drive, USB flash drive, memory card, floppy disk, optical disc such as a CD or a DVD, magnetic tape, and other memory components. For example, RAM may comprise one or more SRAM, DRAM, MRAM, and other forms of RAM. For example, ROM may comprise one or more PROM, EPROM, EEPROM, and other forms of ROM.

Figure 3:
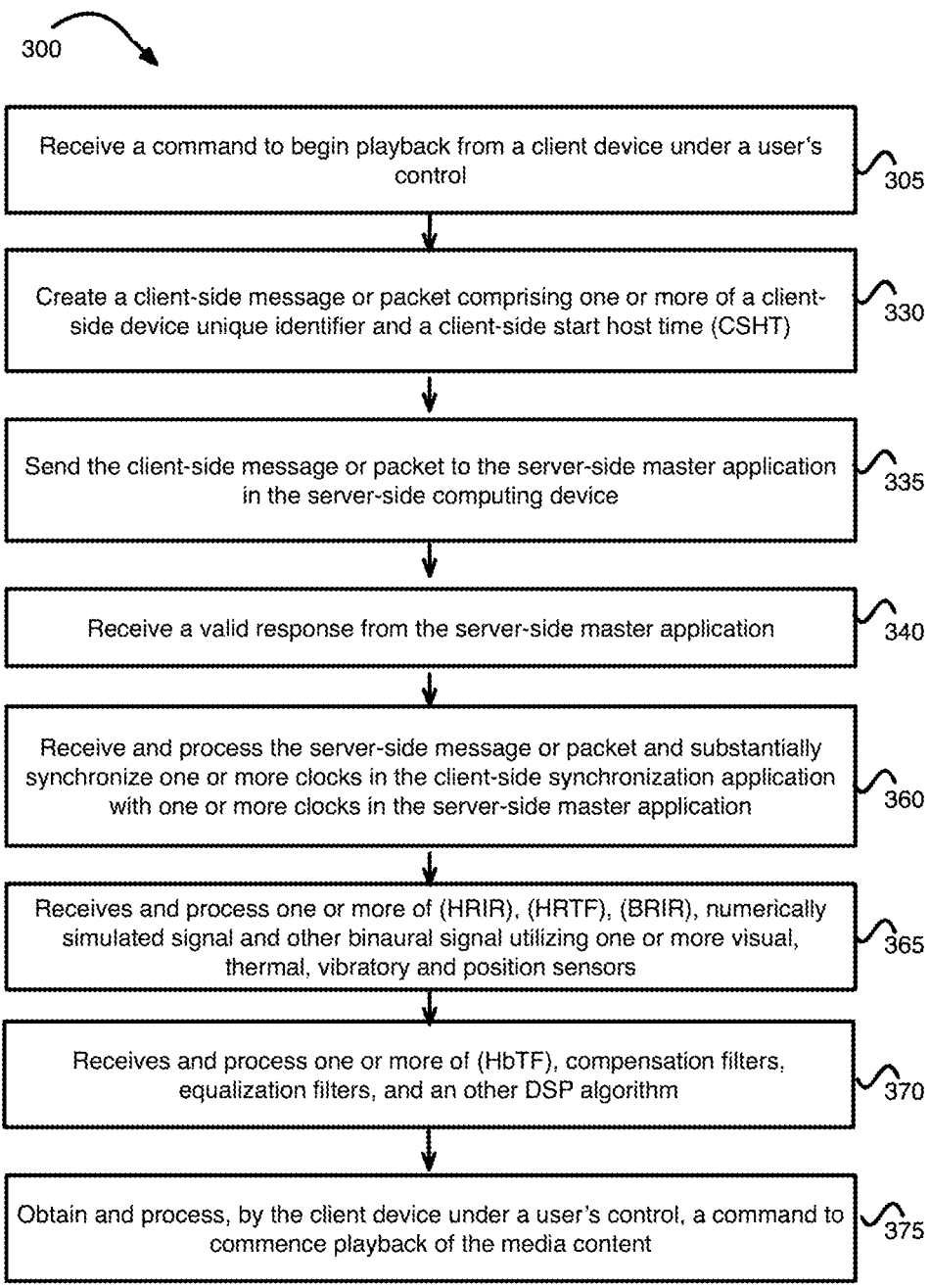
FIG. 3 is a flowchart of a method for real-time synchronization of stock media content.

FIG. 3 is a flowchart of a method 300 for real-time synchronization of stock media content. FIG. 3 applies to the baseline method viewed from the client side.

The order of the steps in the method 300 is not constrained to that shown in FIG. 3 or described in the following discussion. Several of the steps could occur in a different order without affecting the final result.

According to this method, to which we shall refer in shorthand as the baseline method, the client-side device performs the synchronization of the client-side playback with the server-side playback.

In block 305, a client-side synchronization application receives a command to begin playback from the user. In another embodiment, the command to begin playback may be triggered by a pre-determined schedule based on one or more of one or more geographical location, time zone, system clock of server-side computing device, system clock of an external electronic device and client-side device. The stock media content may be customized and played on a client-side playback device in synchronization with server-side playback of the stock media content by a server-side master application. Block 305 then transfers control to block 330.

Next, in block 330, the client-side synchronization application creates a client-side message or packet. The client-side message or packet comprises one or more of a client-side unique identifier and a client-side start host time (CSHT). The client-side unique identifier uniquely identifies the client-side device. The CSHT is defined as a host time at which transmission of a server-side message or packet is requested on the client side. For example, the CSHT may comprise the time at which client-side playback starts. For example, the client-side device comprises one or more of a tablet, a notebook computer, a laptop computer, a cellular phone, and another client-side computing device. For example, the client-side unique identifier comprises an alphanumeric string.

For example, the client-side synchronization application communicates over a network so as to obtain server-side timing information from the server-side master application. For example, to communicate with the server-side master application, the client-side synchronization application browses the network. The client-side synchronization application then resolves the server-side master application. The client-side synchronization application then connects via the network to the server-side master application. Further, one or more of a server-side clock and an external clock may be used to synchronize the server-side master application with the client-side synchronization application. Block 330 then transfers control to block 335.

Next, in block 335, the client-side synchronization application sends the client-side message or packet to the server-side master application. Optionally, to facilitate error detection, a client-side transmitted error code can be added to messages or packets sent from the client-side to the server-side. To facilitate verification of data authenticity, the client-side synchronization application saves the client-side message or packet to one or more of client-side memory and client-side data storage. Block 335 then transfers control to block 340.

Next, in block 340, the client-side synchronization application waits for a pre-determined time period for a valid response from the server-side master application. If a valid response is received within the pre-determined time period, the process continues to step 360. If the client-side synchronization application does not receive a valid response from the server-side master application within a pre-determined time period, the request times out, and the process loops back to step 330.

Next, in block 360, the client-side synchronization application receives and processes the server-side message or packet and substantially synchronizes one or more clocks in the client-side synchronization application with one or more clocks in the server-side master application. Further details of how to perform step 360 are given in FIG. 8. Optionally, an additional step may be inserted here of relaying to the user, by the client-side device, one or more offers to purchase customized goods prepared by the server-side computing device using the user's customization preferences. For example, the customized goods comprise one or more of customized physical goods, customized services, and customized media content. Block 360 then transfers control to block 365.

Next, in block 365, the client-side synchronization application receives and processes one or more head-related impulse response (HRIR) signal, head-related transfer function (HRTF) signal, reverberant environment binaural room impulse response (BRIR) signal, numerically simulated signal, and other binaural signal utilizing one or more of visual sensor, thermal sensor, vibratory sensor, position sensor, and an other sensor. For example, the client-side synchronization application may determine delay-processing time of the (HRIR), (HRTF), (BRIR), and numerically simulated signal and substantially synchronize one or more clocks in the client-side synchronization application with one or more clocks in the server-side master application. Block 365 then transfers control to block 370.

Next, in block 370, the client-side customization application receives and processes one or more bandpass transfer function, headphone transfer function (HpTF), compensation filters, equalization filters, and an other DSP algorithm. For example, the client-side customization application may determine delay-processing time of the (HpTF), and substantially synchronize one or more clocks in the client-side synchronization application with one or more clocks in the server-side master application. Block 370 then transfers control to block 375.

Next, in block 375, the client-side synchronization application begins playback of the customized media content in synchronization with playback of the stock media content by a server-side playback device. Block 375 then terminates the process.

Figure 4:
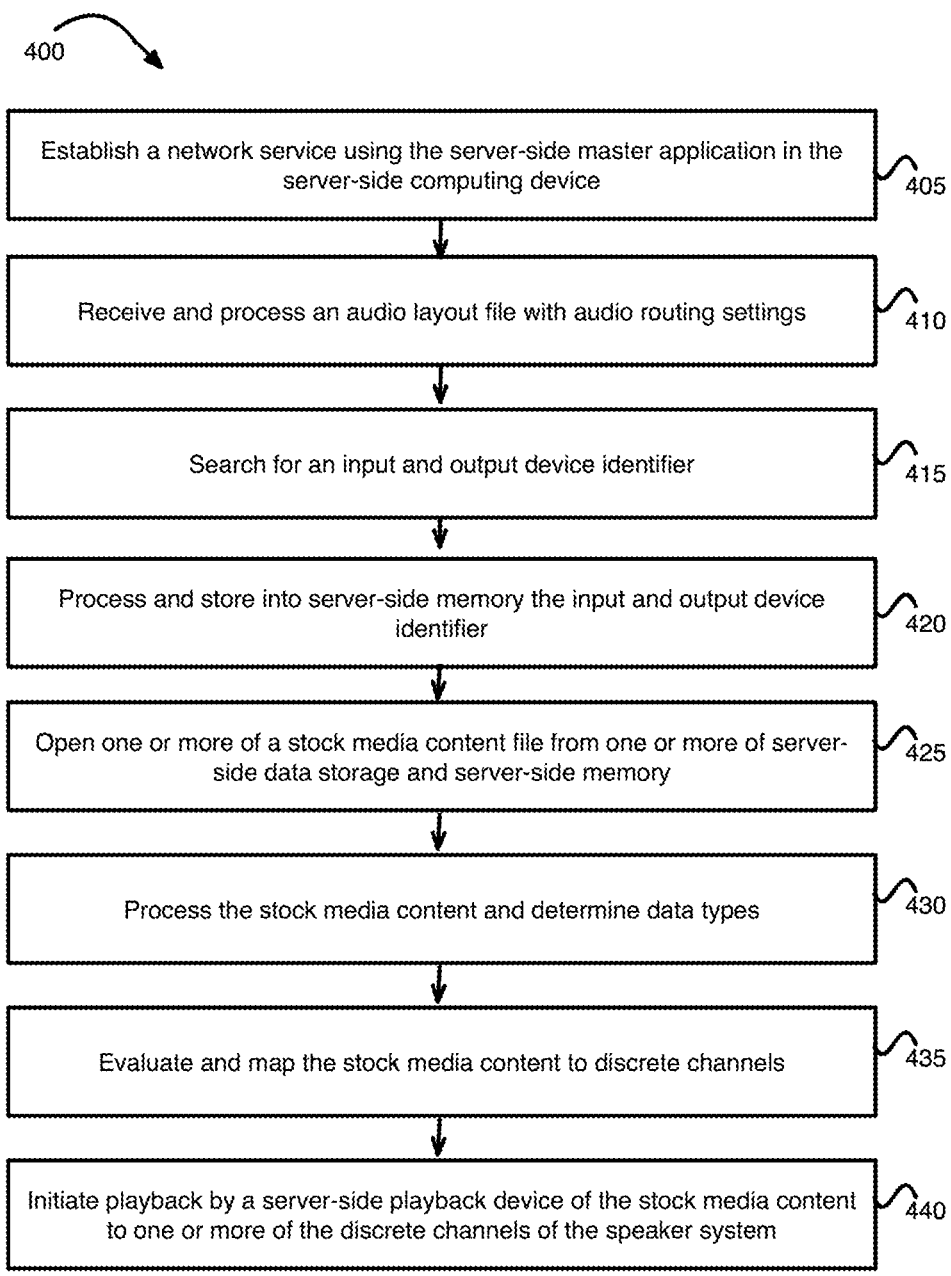
FIG. 4 is a flowchart of a method for initializing a server-side master application for playing stock media content in a server-side computing device.

FIG. 4 is a flowchart of a method for initializing server-side master application for playing stock media content in a server-side computing device. FIG. 4 applies to the baseline and live methods viewed from the server side.

The order of the steps in the method 400 is not constrained to that shown in FIG. 4 or described in the following discussion. Several of the steps could occur in a different order without affecting the final result.

In block 405, a server-side master application establishes a network service. For example, a network service may comprise of publishing one or more of a Domain Name System (DNS), setting up a valid TCP listening socket or a UDP socket, and initializing the service with a name, type, domain and port number. Block 405, then transfers control to block 410.

In block 410, a server-side master application receives and processes channel-based, object-based, scene-based, 3d audio, and audio layout files with audio routing settings. The audio layout file may be received at the time when the server-side master application is initiated or installed. Alternatively or additionally, the audio layout file settings may be received from the server-side data store. Further, the audio layout file may comprise of one or more of discrete channels mapped to a speaker system located in a venue, public, office, school, home and an other environment. For example, one or more of discrete channel may be assigned a unique identifier of one or more of audio tracks in a one or more of stock media content. For example, the stock media content may be one or more of a mono, stereo and multichannel tracks. For example, the unique identifier may be matched to one or more of spherical coordinates of one or more of speaker systems located in a venue, public, office, school, home, and an other environment. For example, the origin of the spherical coordinate is determined from one or more of the center of a room, venue, public, office, school, home, and an other environment. For example, the spherical coordinates may be defined by a radius, an azimuthal angle in mathematical positive orientation when measured counter-clockwise and zenith angle with 0° pointing to the equator and +90° pointing to the North Pole. Alternatively or additionally, a non-spherical coordinate system may be used. Block 410 then transfers control to block 415.

Next, in block 415, the server-side master application searches for an input and output device (I/O) identifier over the network. Block 415 then transfers control to block 420.

Next, in block 420, the server-side master application processes and stores into server-side memory the input and output device (I/O) identifier. Block 420 then transfers control to block 425.

Next, in block 425, the server-side master application opens one or more of a stock media content file from one or more of server-side data storage and server-side memory. For example, a server-side master application evaluates and determines if the stock media content file is encoded. If the stock media content file is encoded, then the server-side master application processes and decodes the encoded stock media content file using one or more encoder matrix, decoder matrix, numerical computing algorithm, spatial audio renderer, and third party plug-ins. For example, a decoder matrix may generate one or more of speaker signals for a specific venue arrangement. Block 425 then transfers control to block 430.

Next, in block 430, the server-side master application processes the stock media content and determines data types. For example, data types may comprise of one or more of audio sample rates, bits per channel, number of tracks and the like. Block 430 then transfers control to block 435.

Next, in block 435, the server-side master application, using an input and output (I/O) device identifier and the audio layout file, evaluates and maps the stock media content to discrete channels. For example, the server-side master application may map as many channels as the server-side computing device's memory, file system and CPU allows. Block 435 then transfers control to block 440.

Next, in block 440, the server-side master application initiates playback by a server-side playback device of the stock media content to one or more of the discrete channels of the speaker systems. Alternatively or additionally, the server-side master application may use one or more of a digital signal-processing algorithm to process the stock media content playback. For example, digital signal processing algorithms may comprise one or more of compression, reverb and EQ. Block 440 then terminates the process.

Figure 5:
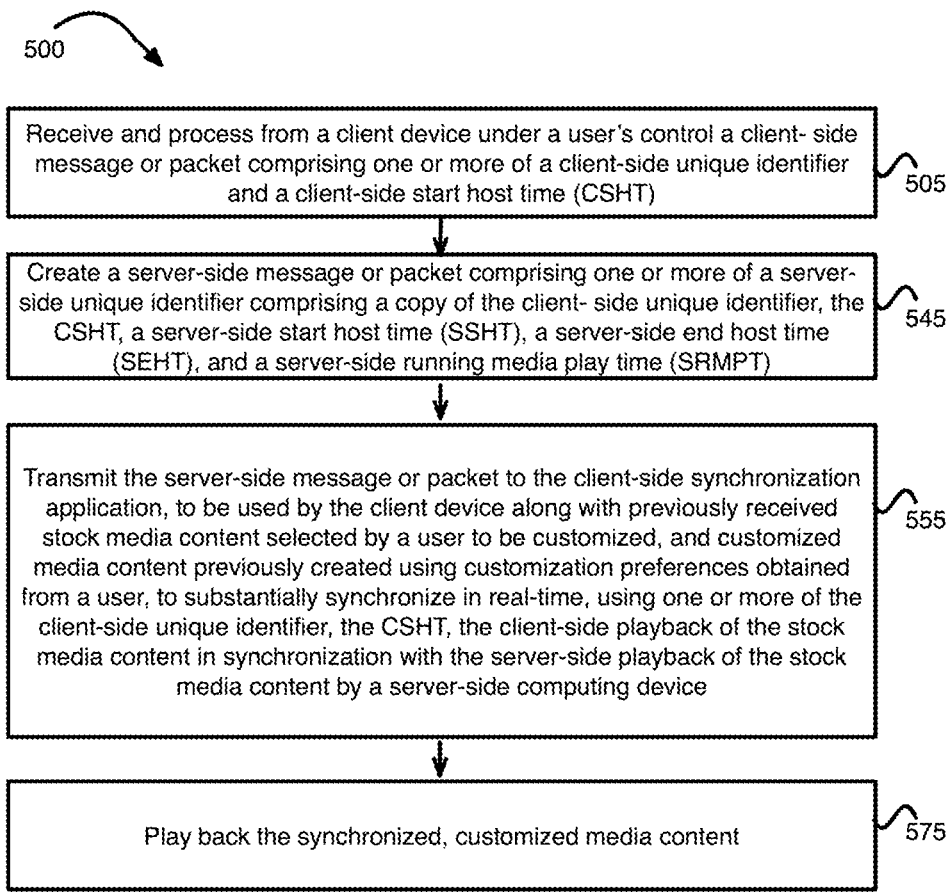
FIG. 5 is a flowchart of a method for real-time synchronization of stock media content.

FIG. 5 is a flowchart of a method 500 for real-time synchronization of stock media content. FIG. 5 applies to the baseline method viewed from the server side.

The order of the steps in the method 500 is not constrained to that shown in FIG. 5 or described in the following discussion. Several of the steps could occur in a different order without affecting the final result.

The server-side master application initiates playback by a server-side playback device of the stock media content. The client-side device performs the synchronization of the client-side playback with the server-side playback.

In block 505, a server-side master application receives and processes from a client-side device under a user's control a client-side message or packet comprising one or more of a client-side unique identifier and a client-side start host time (CSHT). Block 505 then transfers control to block 545.

Next, in block 545, the server-side master application creates a server-side message or packet. For example, the server-side message or packet comprises one or more of a server-side unique identifier, the CSHT, a server-side start host time (SSHT), a server-side end host time (SENT), and a server-side running media play time (SRMPT). The server-side unique identifier comprises a copy of the client-side unique identifier.

Optionally, the server-side master application may use the SRMPT to control General Purpose Input and Output peripherals (GPIO). For example, GPIO may control one or more of motion chairs, projectors, venue lightings, security cameras, masking systems, and wind, liquid, fire and odor effects and the like. Block 545 then transfers control to block 555.

Next, in block 555, the server-side master application transmits the server-side message or packet to the client-side synchronization application, to be used by the client-side synchronization application, along with previously received stock media content selected by a user to be customized, and customized media content previously created using customization preferences obtained from a user, to substantially synchronize in real-time, using the CSHT, client-side playback of the customized media content with server-side playback of the stock media content. Block 555 then transfers control to block 575.

Next, in block 575, the server-side master application begins playback of the stock media content in synchronization with playback of the customized media content by a client-side playback device. Block 575 then terminates the process.

Figure 6:
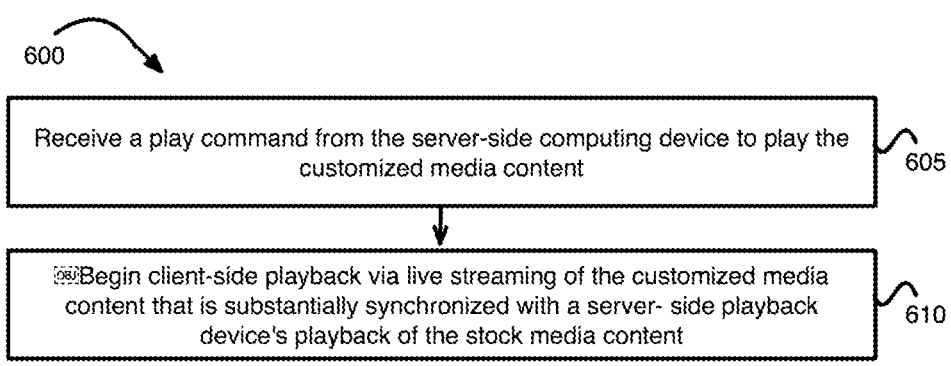
FIG. 6 is a flowchart of a method for real-time synchronization of stock media content.

FIG. 6 is a flowchart of a method 600 for real-time synchronization of stock media content. FIG. 6 applies to the live method viewed from the client side.

The order of the steps in the method 600 is not constrained to that shown in FIG. 6 or described in the following discussion. Several of the steps could occur in a different order without affecting the final result.

According to this method, which covers the live method, the server-side streaming application streams the media content for direct playback using a substantially immediate streaming technology. For example, the server-side streaming application may use one or more HpTF, HRIR, HRTF, BRIR, numerically simulated signal, an other signal, and an other algorithm to process the media content. For example, the streaming technology comprises user datagram protocol (UDP). According to the live method, there is no need for synchronization of the client-side playback and the server-side playback, because the playback is substantially immediate.

In block 605, the client-side synchronization application receives a play command from the server-side master application to play the customized media content. Block 605 then transfers control to block 610.

Next, in block 610, the client-side synchronization application processes the command to begin playback of the customized media content and a client-side playback device begins a playback, using the server-side streaming application, of the customized media content that is substantially synchronized with a server-side playback device's playback of the stock media content. Block 610 then terminates the process.

Figure 7:
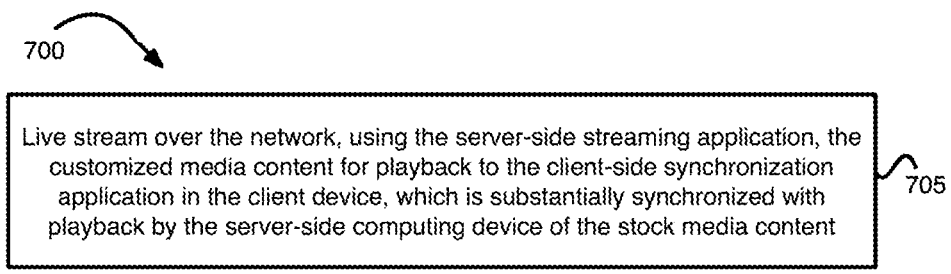
FIG. 7 is a flowchart of a method for real-time synchronization of stock media content.

FIG. 7 is a flowchart of a method 700 for real-time synchronization of stock media content. FIG. 7 applies to the live method viewed from the server side.

The order of the steps in the method 700 is not constrained to that shown in FIG. 7 or described in the following discussion. Several of the steps could occur in a different order without affecting the final result.

The server-side master application initiates playback by a server-side playback device of the stock media content.

In block 705, the server-side streaming application live streams the customized media content to the client-side synchronization application. For example, the server-side streaming application live streams the customized media content using user datagram protocol (UDP).

Figure 8:
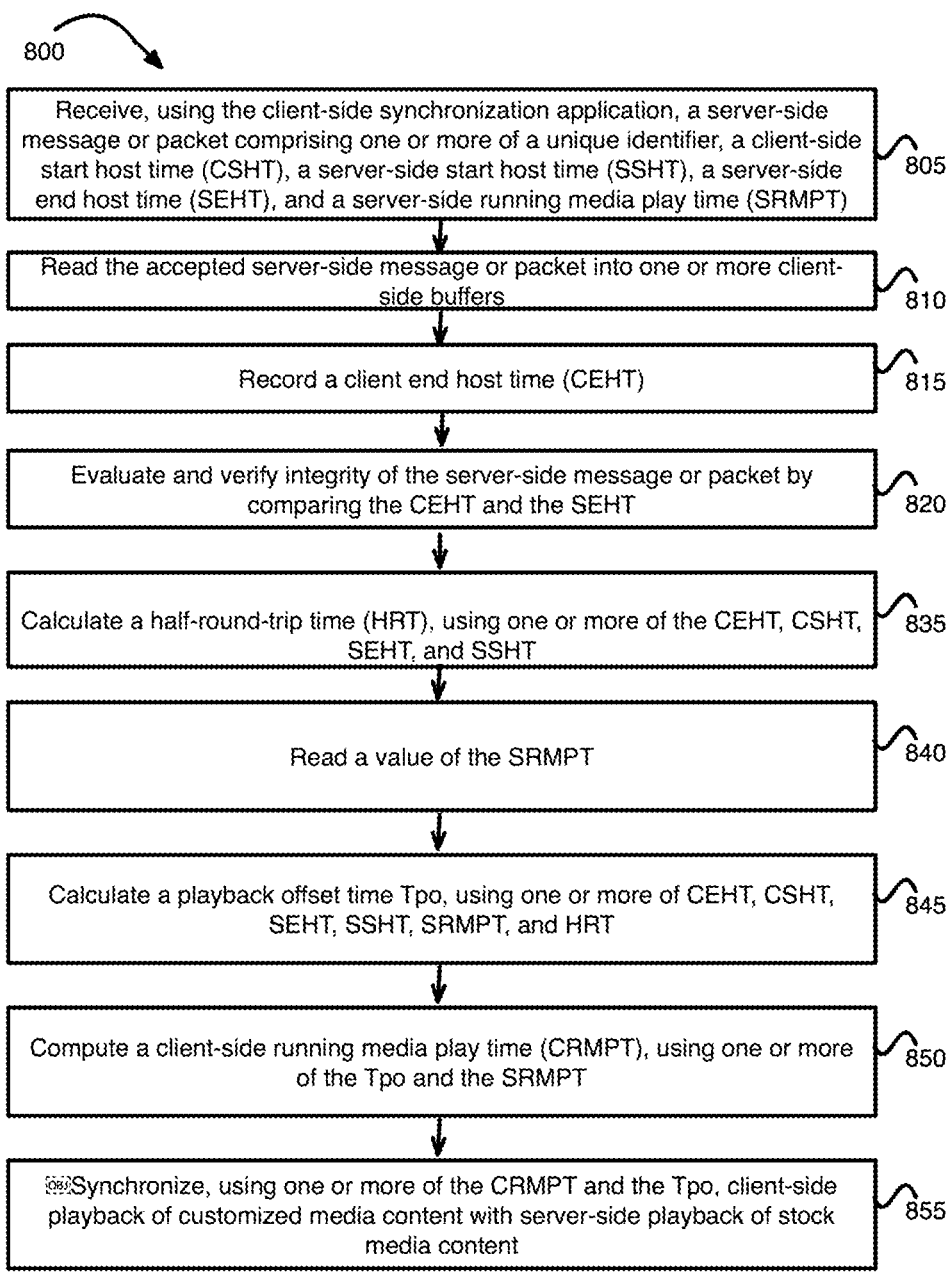
FIG. 8 is a flowchart of a method for receiving and processing a server-side message or packet and synchronizing one or more clocks in a client-side synchronization application with one or more clocks in a server-side master application.

FIG. 8 is a flowchart of a method for receiving and processing a server-side message or packet and synchronizing one or more clocks in a client-side synchronization application with one or more clocks in a server-side master application. FIG. 8 provides more detail regarding sub-steps of step 360 in FIG. 3 for the baseline method.

The order of the steps in the method 800 is not constrained to that shown in FIG. 8 or described in the following discussion. Several of the steps could occur in a different order without affecting the final result.

In block 805, the client-side synchronization application receives a server-side message or packet from the server-side master application. The server-side message or packet comprises one or more of a server-side unique identifier, a client-side start host time (CSHT), a server-side start host time (SSHT), a server-side end host time (SENT), and a server-side running media play time (SRMPT). Optionally, the server-side message or packet further comprises a server-side transmitted error code. Error code algorithms can be used to perform error detection. For example, one or more of a checksum and a longitudinal redundancy check can be used to perform the error check. Optionally, one or more server-side messages or packets is encrypted. Optionally, one or more client-side messages or packets is encrypted. Block 805 then transfers control to block 810.

Next, in block 810, the client-side synchronization application reads the server-side message or packet into one or more client-side buffers. That is, the client-side synchronization application breaks the server-side message or packet into one or more pieces, with each piece corresponding to a data type. Then at least one of the one or more pieces is stored by the client-side synchronization application in a client-side buffer. For example, the server-side unique identifier may be stored in a first client-side buffer. For example, the CSHT may be stored in a second client-side buffer. For example, the SSHT may be stored in a third client-side buffer. For example, the SENT may be stored in a fourth client-side buffer. For example, the SRMPT may be stored in a fifth client-side buffer. For example, the server-side transmitted error code may be stored in a sixth client-side buffer. For example, other components of the server-side message or packet may be stored in other client-side buffers. For example, some of the client-side buffers may be coterminous. For example, all the client-side buffers may be coterminous. Block 810 then transfers control to block 815.

Next, in block 815, the client-side synchronization application records a CEHT. The CEHT is defined as a host time at which transmission of a server-side message or packet ends on the client side. For example, the CEHT may comprise the time at which server-side playback stops. The CEHT is the world value time that the client-side synchronization application records based on the client-side synchronization application's host time.

For example, the time measurement may comprise a timestamp. For example, the real world time may comprise a seconds field representing an integral number of seconds. For example, the real world time may further comprise a microseconds field representing an additional number of microseconds elapsed in addition to the integral number of seconds. For example, the host time measurement represents the number of seconds elapsed since the start of the UNIX epoch at midnight Coordinated Universal Time (UTC) Dec. 31, 1969-Jan. 1, 1970. Block 815 then transfers control to block 820.

Next, in block 820, the client-side synchronization application evaluates the integrity of the server-side message or packet.

Preferably, but not essentially, the client-side synchronization application evaluates the integrity of the server-side message or packet by comparing the CEHT and the SENT. If the CEHT is substantially equal to the SENT, the client-side synchronization application verifies integrity of the server-side message or packet. If the CEHT is not substantially equal to the SENT, the client-side synchronization application verifies a lack of integrity of the server-side message or packet.

Then the client-side synchronization application compares the client-side received error code with the server-side transmitted error code received in the server-side message or packet.

Optionally, or additionally, the client-side synchronization application evaluates the integrity of the server-side message or packet by calculating a server-side received error code for the server-side message or packet, and then the client-side synchronization application compares the server-side received error code with the server-side transmitted error code comprised in the server-side message or packet.

If the calculated server-side received error code is substantially equal to the server-side transmitted error code, the client-side synchronization application verifies integrity of the server-side message or packet. If the calculated server-side received error code is not substantially equal to the server-side transmitted error code, the client-side synchronization application verifies a lack of integrity of the server-side message or packet.

Optionally, or additionally, the client-side synchronization application evaluates the integrity of the server-side message or packet by comparing the server-side unique identifier with the client-side device unique identifier.

If the server-side unique identifier is substantially equal to the client-side device identifier, the client-side synchronization application verifies integrity of the server-side message or packet. If the server-side unique identifier is not substantially equal to the client-side device identifier, the client-side synchronization application verifies a lack of integrity of the server-side message or packet.

If the client-side synchronization application verifies a lack of integrity of the server-side message or packet, the client-side synchronization application deletes the server-side message or packet and sends a message to the client-side synchronization application to request transmission of a replacement server-side message or packet. The process loops back to step 805.

If the client-side synchronization application verifies the integrity of the server-side message or packet, the client-side synchronization application accepts the server-side message or packet. Block 820 transfers control to block 835.

Next, in block 835, using one or more of the CEHT, CSHT, SEHT, and SSHT, the client-side synchronization application then calculates a half-round-trip time. The round-trip time is equal to the time it takes a signal to leave from the client-side synchronization application, arrive at the server-side master application, be received by the server-side master application, be processed by the server-side master application, be retransmitted by the server-side master application, and arrive back at the client-side synchronization application, less the time it takes for the signal to be processed by the server-side master application. For example, the round-trip time RT may be calculated according to equation (1) as:

$$RT=(CEHT-CSHT)-(SEHT-SSHT). \quad (1)$$

Where the server-side processor is faster than a minimal time, for example, where the server-side processor is faster than a playback synchronizing error threshold time, the difference (SEHT minus SSHT) may be negligible. In these cases, the round-trip time RT may be calculated according to equation (2) as:

$$RT=CEHT-CSHT. \quad (2)$$

The client-side synchronization application then computes a half-round-trip time HRT by multiplying the round-trip time RT by 0.5, according to equation (3):

$$HRT = 0.5 * RT \qquad (3)$$

Block 835 then transfers control to block 840.

Next, in block 840, the client-side synchronization application reads the value of SRMPT. For example, the client-side synchronization application reads from the fifth client-side buffer the value of the SRMPT. Block 940 then transfers control to block 845.

Next, in block 845, using one or more of CEHT, CSHT, SENT, SSHT, SRMPT, and HRT, the client-side synchronization application calculates a playback offset time $T_{PO}$. The playback offset time $T_{PO}$ is defined as the time increment by which media playback at the client-side should be speeded up or slowed down relative to media playback at the server-side to synchronize the server-side media and the client-side media.

The playback offset time $T_{PO}$ may be defined as the timing difference between client-side playback and server-side playback. The playback offset time $T_{PO}$ may be calculated according to equation (4):

$$T_{PO} = HRT + BD, \qquad (4)$$

where BD is buffer size delays caused by inadequate sizing of one or more of the client-side buffers. Buffer size delays may be safely ignored if they are sufficiently small. Block 845 then transfers control to block 850.

Next, in block 850, using one or more of the computed playback offset time $T_{PO}$ and the SRMPT, the client-side synchronization application then computes a client-side running media play time (CRMPT). The CRMPT is defined as the elapsed running time for the media content that is being played by the media player on the client. For example, the client-side synchronization application calculates the CRMPT according to equation (5):

$$CRMPT = SRMPT + T_{PO}. \qquad (5)$$

Alternatively, or additionally, the client-side synchronization application makes multiple requests in parallel to the server-side master application. Then, using one or more of statistical analysis and machine learning algorithms, the client-side synchronization application estimates the value of the CRMPT. Block 850 then transfers control to block 855.

Next, in block 855, using one or more of the computed CRMPT and the computed playback offset time $T_{PO}$, the client-side synchronization application synchronizes client-side playback of customized media content with server-side playback of stock media content. For example, the client-side synchronization application adjusts the playback to synchronize the client-side synchronization application to the client-side playback device. For example, the client-side synchronization application adjusts the playback to synchronize the client-side synchronization application to the client-side playback device by offsetting the playback time of the client-side media player by the playback offset time $T_{PO}$.

Alternatively, for example, a single system call can be used to calculate one or more of the CRMPT and playback offset time $T_{PO}$. Alternatively, multiple systems calls may be performed to improve accuracy. For example, accuracy may be improved via one or more of linear regression, a sum of averages, a technique for evaluating statistical significance, a machine learning algorithm, and the like.

One or more of automatic re-synchronization and manual re-synchronization may be performed as needed. For example, after a while the clock may drift, meaning that one or more of a stream and a download of the media content that starts out synchronized may gradually become de-synchronized. In such cases, resynchronization may be performed by one or more of manual execution and automatic execution of a re-synchronization of the client-side synchronization application in the client-side synchronization application with the server-side master application in the server-side master application.

The client-side synchronization application may request at random or at pre-determined time intervals the player's synchronization time on the server-side master application in the server-side computing device. If there is a difference of more than a pre-determined offset, the client-side device will vary the rate of the playback until the drift is corrected. In another embodiment, a digital signal-processing algorithm may be used to time compress or stretch the playback. Block 855 then terminates the process.

Figure 9:
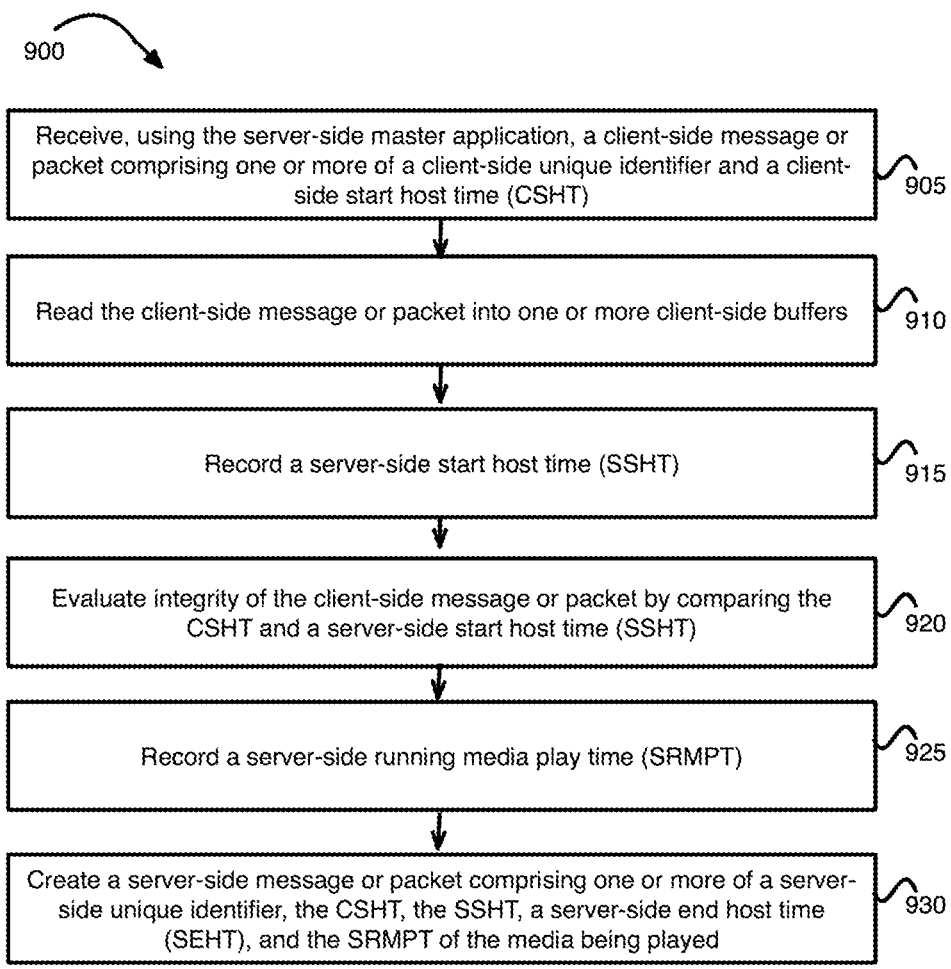
FIG. 9 is a flowchart of a method for receiving and processing a client-side message or packet and synchronizing one or more clocks in a client-side synchronization application with one or more clocks in a server-side master application.

FIG. 9 is a flowchart of a method for receiving and processing a client-side message or packet and synchronizing one or more clocks in a client-side synchronization application with one or more clocks in a server-side master application. FIG. 9 provides more detail regarding sub-steps of step 545 in FIG. 5 for the baseline method.

The order of the steps in the method 900 is not constrained to that shown in FIG. 9 or described in the following discussion. Several of the steps could occur in a different order without affecting the final result.

In block 905, the server-side master application receives a client-side message or packet from the client-side synchronization application. The client-side message or packet comprises one or more of a client-side unique identifier and a client-side start host time (CSHT). Optionally, the client-side message or packet further comprises a client-side transmitted error code. Error code algorithms can be used to perform error detection. For example, one or more of a checksum and a longitudinal redundancy check can be used to perform the error check. Block 905 then transfers control to block 910.

Next in block 910, the server-side master application reads the client-side message or packet into one or more server-side buffers. That is, the server-side master application breaks the client-side message or packet into one or more pieces, with each piece corresponding to a data type. Then at least one of the one or more pieces is stored by the server-side master application in a server-side buffer. For example, the client-side unique identifier may be stored in a first server-side buffer. For example, CSHT may be stored in a second server-side buffer. For example, the client-side transmitted error code may be stored in a third server-side buffer. For example, other components of the client-side message or packet may be stored in other server-side buffers. For example, some of the server-side buffers may be coterminous. For example, all the server-side buffers may be coterminous. Block 910 then transfers control to block 915.

Next, in block 915, the server-side master application records a server-side start host time (SSHT).

For example, the time measurement may comprise a timestamp. For example, the real world time may comprise a seconds field representing an integral number of seconds. For example, the real world time may further comprise a microseconds field representing an additional number of microseconds elapsed in addition to the integral number of seconds. For example, the host time measurement represents the number of seconds elapsed since the start of the UNIX epoch at midnight Coordinated Universal Time (UTC) Dec. 31, 1969-Jan. 1, 1970. Block 915 then transfers control to block 920.

Next, in block 920, the server-side master application evaluates the integrity of the client-side message or packet.

Preferably, but not essentially, the server-side master application evaluates the integrity of the client-side message or packet by comparing the CSHT and the server-side start host time (SSHT). If the CSHT is substantially equal to the SSHT, the server-side master application verifies integrity of the client-side message or packet. If the CSHT is not substantially equal to the SSHT, the server-side master application verifies a lack of integrity of the client-side message or packet.

Optionally, or additionally, the server-side master application evaluates the integrity of the client-side message or packet by calculating a client-side received error code for the client-side message or packet, and then the server-side master application compares the client-side received error code with the client-side transmitted error code comprised in the client-side message or packet.

If the calculated client-side received error code is substantially equal to the client-side transmitted error code, the server-side master application verifies integrity of the client-side message or packet. If the calculated client-side received error code is not substantially equal to the client-side transmitted error code, the server-side master application verifies a lack of integrity of the client-side message or packet.

If the server-side master application verifies a lack of integrity of the client-side message or packet, the server-side master application deletes the client-side message or packet and sends a message to the client-side synchronization application to request transmission of a replacement client-side message or packet. The process loops back to step 905.

If the server-side master application verifies the integrity of the client-side message or packet, the server-side master application accepts the client-side message or packet. Block 920 transfers control to block 925.

Next, in block 925, the server-side master application records a server-side running media play time (SRMPT). If no customized media content is being played by the server-side media player, the SRMPT is set to zero. Block 925 then transfers control to block 930.

Next, in block 930, the server-side master application creates a server-side message or packet. The server-side message or packet comprises one or more of a server-side unique identifier, the CSHT, the SSHT, a server-side end host time (SENT), and the SRMPT of the media being played. Optionally, to facilitate error detection, the server-side master application adds a server-side transmitted error code to one or more server-side messages it sends to the client-side synchronization application. Block 930 then terminates the process.

Figure 10:
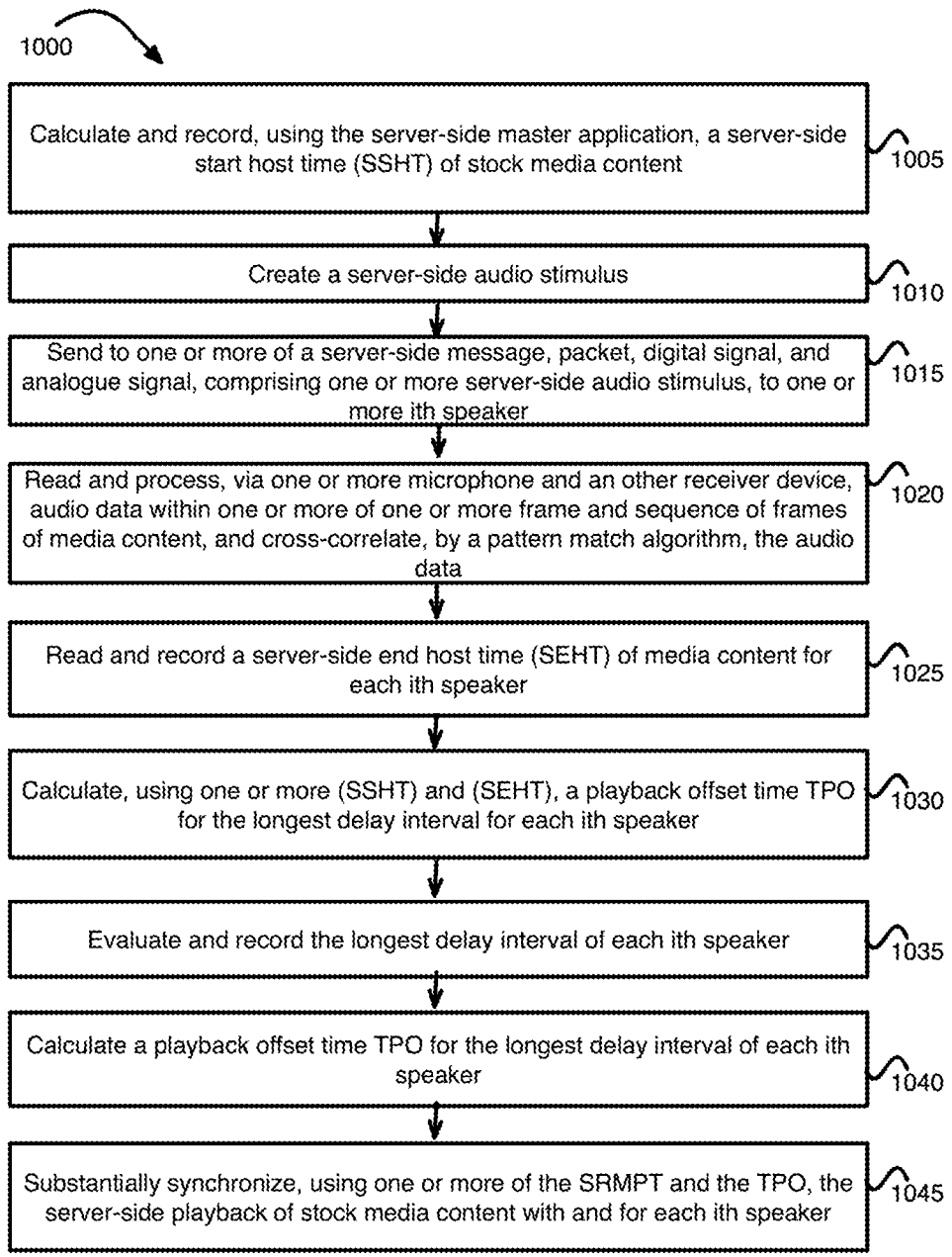
FIG. 10 is a flowchart of a method for receiving and processing a server-side message, packet, digital signal or analogue signal, and synchronizing one or more clocks in a server-side master application with one or more clocks in a server-side playback device and speaker system.

FIG. 10 is a flowchart of a method for receiving and processing a server-side message, packet, digital signal or analogue signal, and synchronizing one or more clocks in a server-side master application with one or more clocks in server-side playback device and speaker system. FIG. 10 applies to the baseline method and live method viewed from the server side.

The order of the steps in the method 1000 is not constrained to that shown in FIG. 10 or described in the following discussion. Several of the steps could occur in a different order without affecting the final result.

In block 1005, the server-side master application is configured to calculate and record, by the server-side computing device, a server-side start host time (SSHT) of stock media content. Block 1005 then transfers control to block 1010.

Next, in block 1010, the server-side master application creates a server-side audio stimulus, the server-side audio stimulus comprising one or more of one or more speech, music, noise, frequency log sweep, sine sweep, and an other audio stimulus. Block 1010 then transfers control to block 1015.

Next, in block 1015, the server-side master application sends to one or more ith speaker, one or more of a server-side message, packet, digital signal, and analogue signal, comprising one or more server-side audio stimulus, to one or more ith speaker, via a communications network within or around venue, public, office, school and home environment. Block 1015 then transfers control to block 1020.

Next, in block 1020, the server-side master application reads and processes, via one or more microphone and an other receiver device, audio data within one or more of one or more frame and sequence of frames of media content, and cross-correlate, by a pattern match algorithm, the audio data. Block 1020 then transfers control to block 1025.

Next, in block 1025, the server-side master application reads and records a server-side end host time (SENT) of media content for each ith speaker. Block 1025 then transfers control to block 1030.

Next, in block 1030, the server-side master application calculates, using one or more (SSHT) and (SENT), a playback offset time $T_{PO}$ for the longest delay interval for each ith speaker. Block 1030 then transfers control to block 1035.

Next, in block 1035, the server-side master application evaluates and records the longest delay interval of each ith speaker. Block 1035 then transfers control to block 1040.

Next, in block 1040, the server-side master application calculates a playback offset time $T_{PO}$ for the longest delay interval of each ith speaker. Block 1040 then transfer control to block 1045.

Next, in block 1045, the server-side master application substantially synchronizes, using one or more of the SRMPT and the $T_{PO}$, the server-side playback of stock media content with and for each ith speaker.

Alternatively, the server-side master application may further adjust the playback offset time $T_{PO}$ by calculating system latencies introduced in each ith speaker feed, using one or more of bandpass transfer function, equalizer, and an other DSP algorithm. In addition, the pattern match algorithm may separate one or more of audience noise and an other noise from the signal captured by one or more microphone system. Block 1040 then terminates the process.

Advantages of the invention include the ability to individually track a potentially unlimited number of audience members using the unique identifiers comprised in their individual devices. Additionally, media player time is divided into different buffers to improve precision. For example, the minutes and seconds go into different buffers, and then into different packets.

While the above representative embodiments have been described with certain components in exemplary configurations, it will be understood those skilled in the art that other representative embodiments can be implemented using one or more of different configurations and different components. For example, it will be understood by those skilled in the art that the order of certain fabrication steps and certain components can be altered without substantially impairing the functioning of the invention.

For example, one or more of audio, video, and another entertainment format can be playing on the client-side. For example, one of more of audio, video, and another entertainment format can be played on the server-side.

For example, while this application for simplicity at times verifies that the media to be customized is a motion picture, embodiments of the invention are also applicable to silent pictures, video recordings of concerts, audio recordings of concerts, video recordings of interviews, audio recordings of interviews, and countless other media. For example, instead of being implemented by the client-side synchronization application 147 and the server-side master application 185, the steps of the flowchart depicted in FIGS. 3 and 5 may be implemented by one or more of the server-side computing device 170 and the client-side device 120.

For example, instead of being primarily implemented by the client-side customization application 145, the server-side master application 185, and the server-side customization application 190, the steps of the flowchart depicted in FIGS. 8 and 9 may be implemented by one or more of the server-side computing device 170 and the client-side device 120.

For example, instead of being implemented by the client-side customization application 145, the server-side master application 185, the server-side customization application 190, and the server-side streaming application 195, the steps of the flowchart depicted in FIGS. 6 and 7 may be implemented by one or more of the server-side computing device 170 and the client-side device 120. For example, instead of being primarily implemented by the server-side master application 185, the steps of the flowchart depicted in FIG. 4 may be implemented by one or more of the server-side computing device 170 and the client-side device 120.

For example, instead of being located in the client-side memory 130, one or more of the client-side customization application 145, and the client-side synchronization application 147 may be located in a section of the client-side device 120 other than the client-side memory 130.

For example, instead of being located in the server-side memory 180, one or more of the server-side master application 185, the server-side customization application 190, and the server-side streaming application 195 may be located in one or more of the server-side data storage 165 and a section of the server-side computing device 170 other than the server-side memory 180. For example, instead of being a freestanding component of the server-side networked environment 110, the server-side memory 180 may be located in the server-side computing device 170.

For example, the client-side data storage 135 may be separate from the client-side device 120 rather than being comprised in the client-side device 120. For example, the server-side data storage 165 may be comprised in the server-side computing device 170 rather than being separate from the server-side computing device 170.

For example, instead of being the client-side device 120 and the client-side playback device 125 being two separate entities, the client-side playback device 125 may be comprised in the client-side device 120. For example, instead of the client-side customization application 145 and the client-side synchronization application 147 being two separate entities, the client-side synchronization application 147 may be comprised in the client-side customization application 145. For example, instead of the client-side customization application 145 and the client-side synchronization application 147 being two separate entities, the client-side customization application 145 may be comprised in the client-side synchronization application 147.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for real-time customization and synchronization of stock media content, comprising:
    calculating and recording, by a server-side computing device, a server-side start host time (SSHT) of stock media content;
    creating, by the server-side computing device, a server-side audio stimulus;
    sending, by the server-side computing device, to one or more $i^{th}$ speaker of a speaker system, the server-side audio stimulus;
    reading and processing, by the server-side computing device and via one or more of a microphone and an other receiver device, audio data within one or more of a frame or a sequence of frames of media content played by the one or more $i^{th}$ speaker;
    reading and recording, by the server-side computing device, a server-side end host time (SEHT) of the stock media content for each $i^{th}$ speaker;
    evaluating and recording, by the server-side computing device, a longest delay interval of each $i^{th}$ speaker;
    calculating, by the server-side computing device, a playback offset time $T_{PO}$ for the longest delay interval of each $i^{th}$ speaker;
    synchronizing, by the server-side computing device, using one or more of a server-side running media play time (SRMPT) and the $T_{PO}$, a server-side playback of the stock media content via each $i^{th}$ speaker with a playback of an on-screen video;
    receiving and processing, by the server-side computing device, from a client-side device under a user's control, a client-side message or packet at one or more predetermined interval during playback of content, the client-side message or packet comprising one or more of a client-side unique identifier, and a client-side start host time (CSHT);
    creating, by the server-side computing device, a server-side message or packet comprising a server-side unique identifier comprising a copy of the client-side unique identifier, the CSHT, a server-side start host time (SSHT), a server-side end host time (SEHT), and the SRMPT;
    transmitting, by the server-side computing device to the client-side device, the server-side message or packet to be used by the client-side device along with previously received stock media content selected by a user to be customized, and customized media content previously created using customization preferences obtained from a user, to synchronize in real-time, using the CSHT, client-side playback of the customized media content with server-side playback of the stock media content; and
    playing back, by the server-side computing device, the stock media content via the speaker system in synchronization with the client-side playback of the customized media content.

2. The method of claim 1, wherein the step of transmitting comprises downloading the customized media content by the server-side computing device to the client-side device.

3. The method of claim 1, wherein the step of transmitting comprises streaming segments of the customized media content by the server-side computing device to the client-side device.

4. The method of claim 1, wherein the step of receiving comprises receiving user customization preference selections from the client-side device, by the server-side computing device.

5. The method of claim 1, wherein the client-side message or packet further comprises user customization preference selections.

6. The method of claim 1, wherein the step of receiving comprises generating, by the server-side computing device, customization preferences for the user using user characteristics comprised in one or more of server-side data storage and server-side memory.

7. The method of claim 1, comprising a further step, performed after the initiating step, of:
preparing, by the server-side computing device, one or more offers to the user to purchase customized goods to be created by the server-side computing device using the user's customization preferences.

8. The method of claim 7, further comprising further steps, performed after the preparing step, of:
processing an offer accepted by the user to purchase the customized goods prepared by the server-side computing device using the user's customization preferences; and
creating, by the server-side computing device, the purchased customized goods.

9. The method of claim 7, wherein the customized goods comprise one or more of customized physical goods, customized services, and customized media content.

10. The method of claim 7, wherein the customized goods comprise one or more of a user-specified name, a user-specified message, and an other form of customization specified by the user.

11. The method of claim 1, wherein the client-side playback of the customized media content is performed via open headphones or semi-open headphones.

12. A method for real-time customization and synchronization of stock media content, comprising:
calculating and recording, by the server-side computing device, a server-side start host time (SSHT) of stock media content;
creating, by the server-side computing device, a server-side audio stimulus;
sending, by the server-side computing device, to one or more $i^{th}$ speaker of a speaker system, the server-side audio stimulus;
reading and processing, by the server-side computing device and via one or more of a microphone and an other receiver device, audio data within one or more of a frame or a sequence of frames of media content played by the one or more $i^{th}$ speaker;
reading and recording, by the server-side computing device, a server-side end host time (SEHT) of the stock media content for each $i^{th}$ speaker;
evaluating and recording, by the server-side computing device, a longest delay interval of each $i^{th}$ speaker;
calculating, by the server-side computing device, a playback offset time $T_{PO}$ for the longest delay interval of each $i^{th}$ speaker;
synchronizing, by the server-side computing device, using one or more of a server-side end host time (SRMPT) and the $T_{PO}$, a server-side playback of the stock media content via each $i^{th}$ speaker with a playback of an on-screen video;
receiving and processing, by the server-side computing device, from a client-side device under a user's control, a client-side message or packet at one or more predetermined interval during playback of content, the client-side message or packet comprising one or more of a client-side unique identifier, and a client-side start host time (CSHT);
creating, by the server-side computing device, a server-side message or packet comprising a server-side unique identifier comprising a copy of the client-side unique identifier, the CSHT, a server-side start host time (SSHT), a server-side end host time (SEHT), and the SRMPT;
transmitting, by the server-side computing device to the client-side device, the server-side message or packet to be used by the client-side device along with previously received stock media content selected by a user to be customized, and customized media content previously created using customization preferences obtained from a user, to synchronize in real-time, using the CSHT, client-side playback of the customized media content with server-side playback of the stock media content; and
playing back, by the server-side computing device, the stock media content via speaker system in synchronization with the client-side playback of the customized media content.

13. The method of claim 12, wherein the step of calculating, the server-side computing device adjusts the playback offset time $T_{PO}$ by calculating system latencies introduced in each $i^{th}$ speaker feed, using one or more of bandpass transfer function, headphone transfer function (HpTF), compensation filters, equalization filters, and an other DSP algorithm.

14. The method of claim 12, wherein the step of calculating, the server-side computing device uses a configuration file with a room response to calculate the playback offset time offset $T_{PO}$ for each $i^{th}$ speaker.

15. The method of claim 12, wherein the step of creating, the server-side computing device uses a pattern match algorithm to separate one or more of audience noise and an other noise from the signal captured by the microphone.

16. The method of claim 12, wherein the step of synchronizing, the server-side computing device, using one or more of SRMPT and the $T_{PO}$, synchronizes the server-side playback of stock media content with and for each ith speaker in a zone or group defined by one or more speaker system.

17. The method of claim 12, wherein the client-side playback of the customized media content is performed via open headphones or semi-open headphones.

18. A server-side computing device for synchronizing media content, comprising:
a processor; and
a non-transitory computer-readable storage medium storing instructions that, when executed by the processor, cause the processor to execute the steps of:
calculating and recording a server-side start host time (SSHT) of stock media content;
creating a server-side audio stimulus;
sending to one or more $i^{th}$ speaker of a speaker system the server-side audio stimulus;
reading and processing, via one or more of a microphone and an other receiver device, audio data within one or more of a frame or a sequence of frames of media content played by the one or more $i^{th}$ speaker;

reading and recording a server-side end host time (SEHT) of the stock media content for each $i^{th}$ speaker;

evaluating and recording a longest delay interval of each $i^{th}$ speaker;

calculating a playback offset time $T_{PO}$ for the longest delay interval of each $i^{th}$ speaker;

synchronizing, using one or more of a server-side running media play time (SRMPT) and the $T_{PO}$, a server-side playback of the stock media content via each $i^{th}$ speaker with a playback of an on-screen video;

receiving and processing, from a client-side device under a user's control, a client-side message or packet at one or more pre-determined interval during playback of content, the client-side message or packet comprising one or more of a client-side unique identifier, and a client-side start host time (CSHT);

creating a server-side message or packet comprising a server-side unique identifier comprising a copy of the client-side unique identifier, the CSHT, a server-side start host time (SSHT), a server-side end host time (SEHT), and the SRMPT;

transmitting, to the client-side device, the server-side message or packet to be used by the client-side device along with previously received stock media content selected by a user to be customized, and customized media content previously created using customization preferences obtained from a user, to synchronize in real-time, using the CSHT, client-side playback of the customized media content with server-side playback of the stock media content; and playing back the stock media content via the speaker system in synchronization with the client-side playback of the customized media content.

* * * * *